United States Patent
Nagase

(10) Patent No.: US 7,746,114 B2
(45) Date of Patent: Jun. 29, 2010

(54) BUS SWITCH AND ELECTRONIC SWITCH

(75) Inventor: Kazuyoshi Nagase, Nishikasugai-gun (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 12/285,476

(22) Filed: Oct. 7, 2008

(65) Prior Publication Data

US 2009/0121776 A1 May 14, 2009

(30) Foreign Application Priority Data

Nov. 14, 2007 (JP) ............................. 2007-295614
Jul. 14, 2008 (JP) ............................. 2008-182678

(51) Int. Cl.
*H03K 19/094* (2006.01)

(52) U.S. Cl. .......................................... 326/82; 326/26

(58) Field of Classification Search ................. 326/26, 326/27, 82, 83; 327/333, 403, 427, 437
See application file for complete search history.

(56) References Cited

U.S. PATENT DOCUMENTS

| | | | |
|---|---|---|---|
| 5,874,850 A | 2/1999 | Pulvirenti et al. | |
| 5,964,815 A | 10/1999 | Wallace et al. | |
| 6,100,719 A * | 8/2000 | Graves et al. | 326/86 |
| 6,320,408 B1 * | 11/2001 | Kwong | 326/31 |
| 6,356,141 B1 | 3/2002 | Yamauchi | |
| 6,448,671 B1 | 9/2002 | Wallace et al. | |
| 6,570,435 B1 | 5/2003 | Hastings | |
| 6,819,162 B2 | 11/2004 | Pelliconi | |
| 6,924,694 B2 * | 8/2005 | Kinugasa et al. | 327/566 |
| 7,259,589 B1 * | 8/2007 | Hui et al. | 326/63 |
| 7,372,301 B2 * | 5/2008 | Fukuoka et al. | 326/81 |
| 2001/0004751 A1 | 6/2001 | Necker et al. | |
| 2004/0030969 A1 | 2/2004 | Kuramochi et al. | |
| 2004/0232973 A1 * | 11/2004 | Kinugasa et al. | 327/437 |
| 2006/0226887 A1 * | 10/2006 | Grimone, III | 327/403 |
| 2006/0238219 A1 * | 10/2006 | Takiba | 326/63 |

FOREIGN PATENT DOCUMENTS

| | | |
|---|---|---|
| JP | A-H10-322370 | 12/1998 |
| JP | A-2002-529837 | 9/2002 |
| JP | A-2007-235870 | 9/2007 |

OTHER PUBLICATIONS

Office Action mailed Nov. 10, 2009 in corresponding Japanese patent application No. 2008-182678 (and English translation).

* cited by examiner

*Primary Examiner*—Don P Le
(74) *Attorney, Agent, or Firm*—Posz Law Group, PLC

(57) ABSTRACT

A bus switch for connecting and disconnecting a bus connection provided by a pair of buses includes a first switching element and a second switching element. The first switching element is coupled between an input terminal and an output terminal of a high-potential side bus of the pair of buses. The second switching element is coupled between an input terminal and an output terminal of a low-potential side bus of the pair of buses. The bus connection is connected when the first switching element and the second switching element are activated, and the bus connection is disconnected when the first switching element and the second switching element are deactivated.

15 Claims, 17 Drawing Sheets

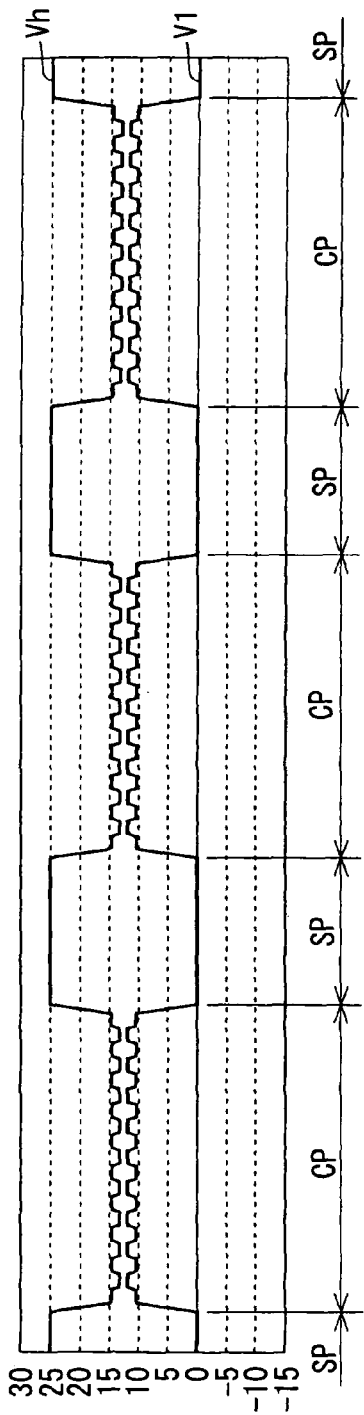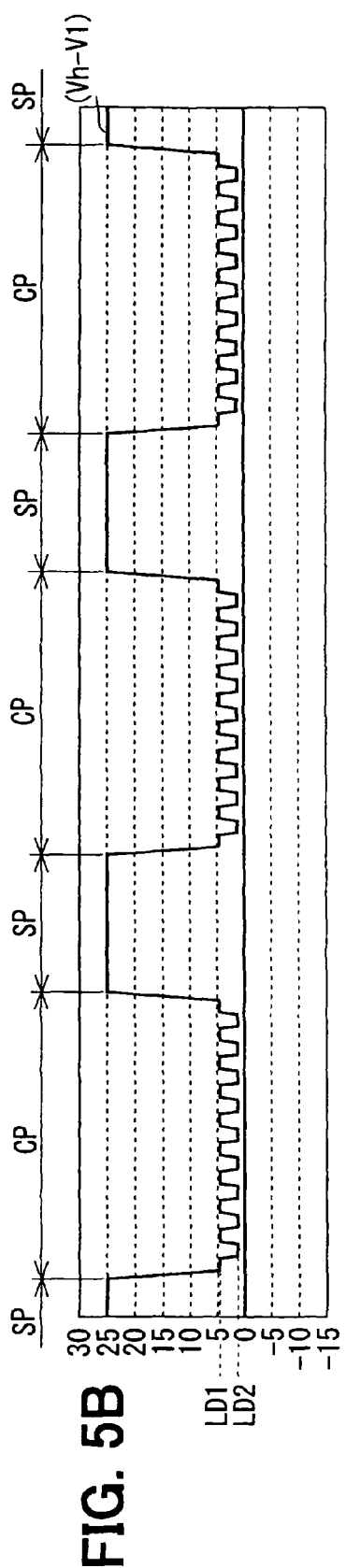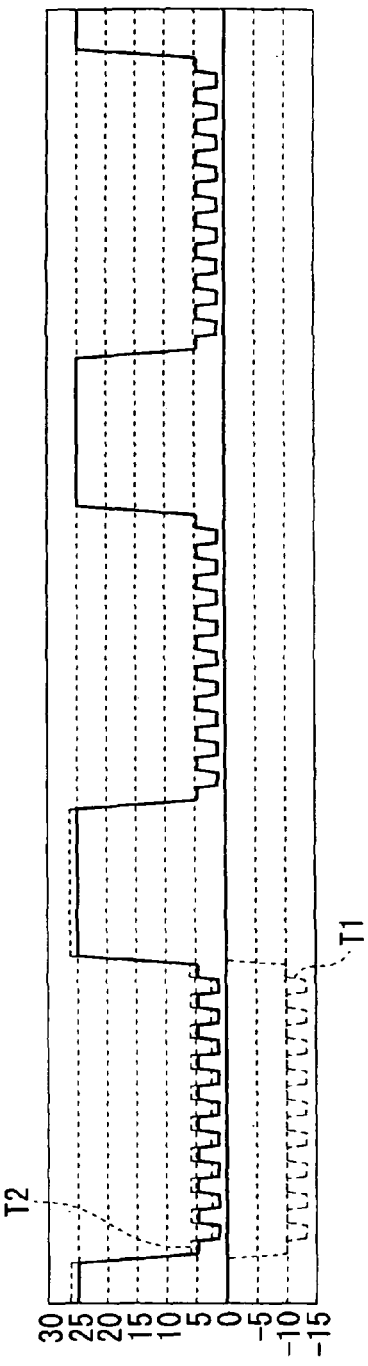

BUS SWITCH AND ELECTRONIC SWITCH

CROSS REFERENCE TO RELATED APPLICATIONS

The present application is based on and claims priority to Japanese Patent Applications No. 2007-295614 filed on Nov. 14, 2007 and No. 2008-182678 filed on Jul. 14, 2008, the contents of which are incorporated in their entirety herein by reference.

BACKGROUND OF THE INVENTION

1. Field of the Invention

The present invention relates to a bus switch and an electronic switch.

2. Description of the Related Art

Conventionally, a bus switch is used for connecting and disconnecting a pair of buses, for example, provided in a local area network of a vehicle (i.e., in-vehicle LAN). In a system disclosed in U.S. Pat. No. 6,448,671, a master and one or more slaves are coupled in a daisy chain manner through a pair of buses for responding to a fault condition. The master and the one or more slaves are coupled in the daisy chain manner or are coupled in parallel, and electronic switches are coupled in series to one side of the pair of buses for connecting and disconnecting the daisy chain. In a system disclosed in U.S. Pat. No. 5,964,815, one side of a pair of buses can be connected and disconnected by switching an N-channel metal oxide semiconductor transistor (nMOS transistor) by using a control circuit.

In the above-described systems, when an abnormality of a bus potential (e.g., open or short) occurs, the abnormality is difficult to be avoided. Thus, if the bus is shorted to a power source or ground, a slave circuit may be adversely affected.

In a case where an nMOS transistor is used as a switch of the bus, if the bus is shorted to ground, a drain potential may decrease below a source potential. Thus, a parasitic element may generate and the switch is difficult to be disconnected. This sort of abnormality due to the parasitic element may occur not only in the bus switch but also in an electronic switch for switching energization and deenergization.

SUMMARY OF THE INVENTION

In view of the foregoing problems, it is an object of the present invention to provide a bus switch and another object of the invention is to provide an electronic switch.

A bus switch according to an aspect of the invention includes a first switching element and a second switching element. The first switching element is coupled between an input terminal and an output terminal of a high-potential side bus of a pair of bus. The second switching element is coupled between an input terminal and an output terminal of a low-potential side bus of the pair of bus. The pair of bus provides a bus connection that couples a plurality of nodes in a daisy chain manner. A part of nodes is located on an upstream side of the bus switch and the other part of the nodes is located on a downstream side of the bus switch. The bus connection between the part of nodes and the other part of nodes is connected when the first switching element and the second switching element are activated. The bus connection between the part of nodes and the other part of nodes is disconnected when the first switching element and the second switching element are deactivated. The present bus switch can disconnect the pair of buses with a certainty even when abnormality occurs in one of the buses.

An electronic switch according to another aspect of the invention includes an input terminal, an output terminal, and a switching element coupled between the input terminal and the output terminal. The switching element includes a supporting substrate, a plurality of metal-oxide semiconductor transistors, and a plurality of resistance elements. The plurality of metal-oxide semiconductor transistors is located on the supporting substrate and is coupled in series between the input terminal and the output terminal so as to have a common source or a common drain. Each of the resistance elements is coupled between a gate and a source of a respective one of the metal-oxide semiconductor transistors. The switching element is configured to be activated when a predetermined electric current is supplied to the resistance elements and the switching element is configured to be deactivated when the resistance elements are deenergized. The present electronic switch can disconnect the input terminal and the output terminal with a certainty.

BRIEF DESCRIPTION OF THE DRAWINGS

Additional objects and advantages of the present invention will be more readily apparent from the following detailed description of preferred embodiments when taken together with the accompanying drawings. In the drawings:

FIG. 5A is a timing chart showing a bus potential viewed from a master side, FIG. 5B is a timing chart showing a bus potential viewed from a slave side, and FIG. 5C is a timing chart showing a bus potential when a bus is shorted to ground or a battery;

DETAILED DESCRIPTION OF THE PREFERRED EMBODIMENTS

First Embodiment

A bus switch according to a first embodiment of the invention can be suitably used in a local area network of a vehicle (i.e., in-vehicle LAN) for an airbag control system.

As network protocols used for the in-vehicle LAN, protocols of two-wire daisy chain connection such as a distributed system interface standard (DSI standard) and a safe-by-wire standard (SbW standard) are proposed. In the protocols, electricity is supplied to respective slaves through a pair of buses. The pair of buses is a twisted-pair differential bus. The slaves transmit and receive data with each other through the pair of buses. The slaves do not obtain electricity individually. The slaves perform processes in each slave while keeping electricity supplied from a master. The standards can be used for a sub bus of a system in a safety control field including an airbag. In the standards, the master for controlling a bus operation and the slaves disposed at the airbag or a sensor are coupled in a daisy chain manner.

Because the standards are used in the safety control field, the standards include a fault tolerance. In the DSI standard, when an abnormality occurs in one slave, a switch provided in a slave located on an upstream side of the abnormal slave is deactivated (i.e., turned off) so as to separate the abnormal slave and slaves located on a downstream side of the abnormal slave. Thereby, the slaves located on the upstream side of the abnormal slave can be normally operated.

In the DSI standard, a time when the master and the slaves transmit and receive signals is divided into an electricity-supply phase and a communication phase. In the electricity-supply phase, electricity is supplied from the master to the slaves. In the communication phase, a data communication is performed between the master and the slaves. In the electricity-supply phase and the communication phase, potentials at a high-potential side bus and a low-potential side bus in a pair of bases change symmetrically with reference to a predetermined center potential. Thereby, even when an electro magnetic compatibility (EMC) is taken into consideration, undesirable noise can be restricted and undesirable radiation can be reduced.

Figure 3:
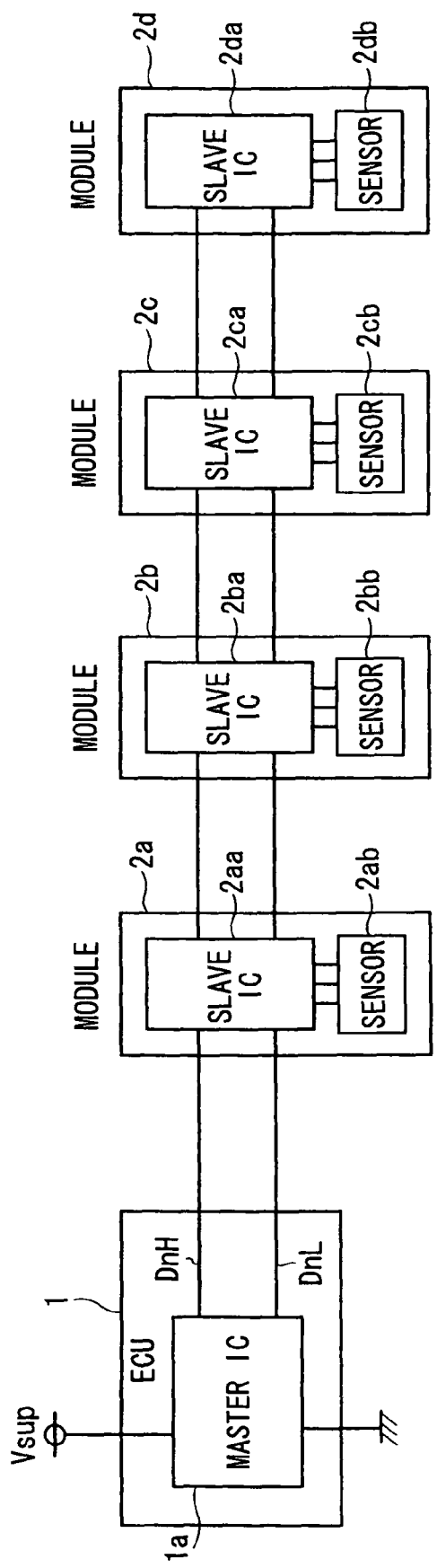
FIG. 3 is a diagram showing a system configuration of a master and slaves.

In the present embodiment, an air bag electronic control unit (ECU) 1 is provided as a master and acceleration sensor modules (modules) 2a-2d are provided as slaves. As shown in FIG. 3, an ECU 1 includes a master integrated circuit (master IC) 1a. The master IC 1a is supplied with a power supply voltage Vsup. The power supply voltage Vsup is set to be in a range from about 7 V to about 26.5 V. For example, the power supply voltage Vsup is about 25 V. The ECU 1 is coupled with the modules 2a-2d in a daisy chain connection through a pair of buses DnH and DnL. The pair of buses DnH and DnL is formed of two signal lines. The module 2a includes a slave integrated circuit (slave IC) 2aa and an acceleration sensor 2ab coupled with slave IC 2aa. In a manner similar to the module 2a, the module 2b includes a slave IC 2ba and an acceleration sensor 2bb, the module 2c includes a slave IC 2ca and an acceleration sensor 2cb, and the module 2d includes a slave 2da and an acceleration sensor 2db.

The modules 2a-2d have similar electronic configurations. Thus, an electronic configuration of the slave IC 2aa in the module 2a will now be described and a description of the electronic configurations of the slave ICs 2ba-2da in the modules 2b-2d is omitted.

Figure 1:
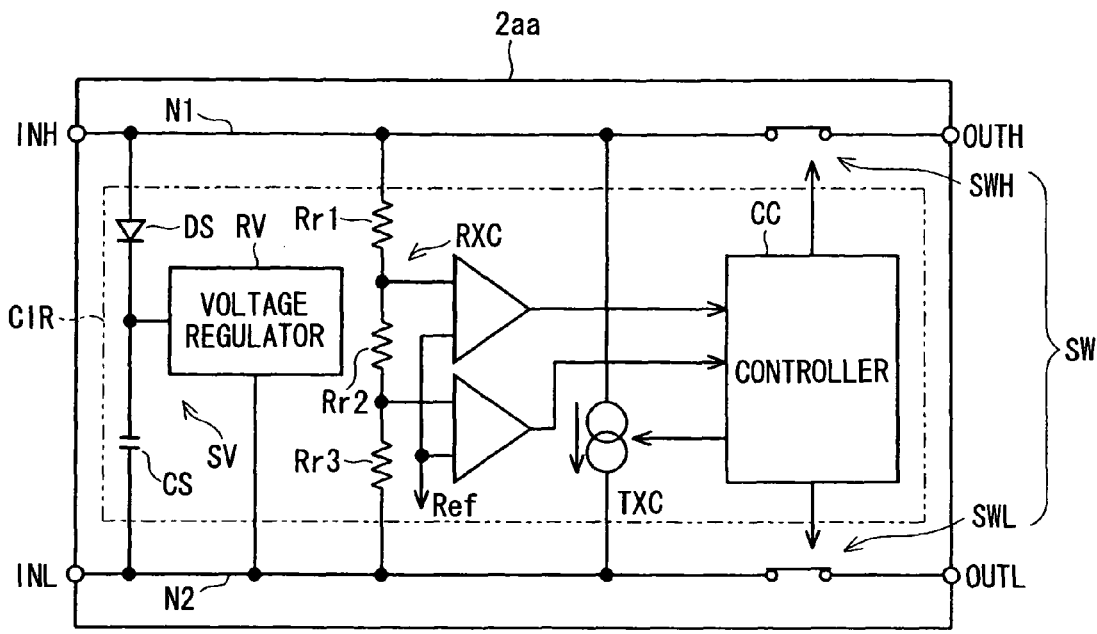
FIG. 1 is a diagram showing an electronic configuration of a slave integrated circuit according to a first embodiment of the invention.

As shown in FIG. 1, the slave IC 2aa includes a functional circuit CIR and a switch section SW. The functional circuit CIR is coupled between the pair of buses DnH and DnL. The switch section SW is provided for connecting and disconnecting the functional circuit CIR with a downstream side of an electricity flow. The functional circuit CIR is coupled between input terminals INH and INL located on a master side of the slave IC 2aa. The functional circuit CIR includes a power supply circuit SV, a receiving circuit RXC, a transmitting circuit TXC, and a control circuit CC. The functional circuit CIR further includes a high voltage generating circuit such as a charge pump circuit (not shown) for generating a high voltage Vcp. The high voltage Vcp is higher than the power supply voltage. For example, the high voltage is about 40 V.

The power supply circuit SV includes a diode DS, a capacitor CS, and a voltage regulator RV connected in series between nodes N1 and N2. The diode DS is provided for preventing a backflow. The capacitor CS is provided for storing the electricity. The voltage regulator RV is provided for inputting two sides voltages of the capacitor CS. The power supply circuit SV stores the electricity supplied from an upstream side to the input terminals INH and INL of the slave IC 2aa. The power supply circuit SV generates a predetermined power supply voltage and supplies the power supply voltage to the module 2a.

The receiving circuit RXC includes voltage dividing resistors Rr1-Rr3 connected in series between the nodes N1 and N2. The receiving circuit RXC detects a voltage change of buses DnH and DnL and a time and transmits a signal to the control circuit CC in accordance with the detected result. The transmitting circuit TXC includes a control-input current source coupled between the nodes N1 and N2. In accordance with a control signal from the control circuit CC, the transmitting circuit TXC outputs electric current from a current source. The ECU 1 monitors a bus current during a predetermined period assigned to each of the modules 2a-2d and detects a change in the current output from the current source of the transmitting circuit TXC. Thereby, the ECU 1 receives data.

The switch section SW includes a high-side switch SWH and a low-side switch SWL. The high-side switch SWH is disposed between a high-potential side input terminal INH and a high-potential side output terminal OUTH of the slave IC 2aa. The low-side switch SWL is disposed between a low-potential side input terminal INL and a low-potential side output terminal OUTL of the slave IC 2aa. The control circuit CC is configured to connect and disconnect each of the high-side switch SWH and the low-side switch SWL.

Figure 2A:
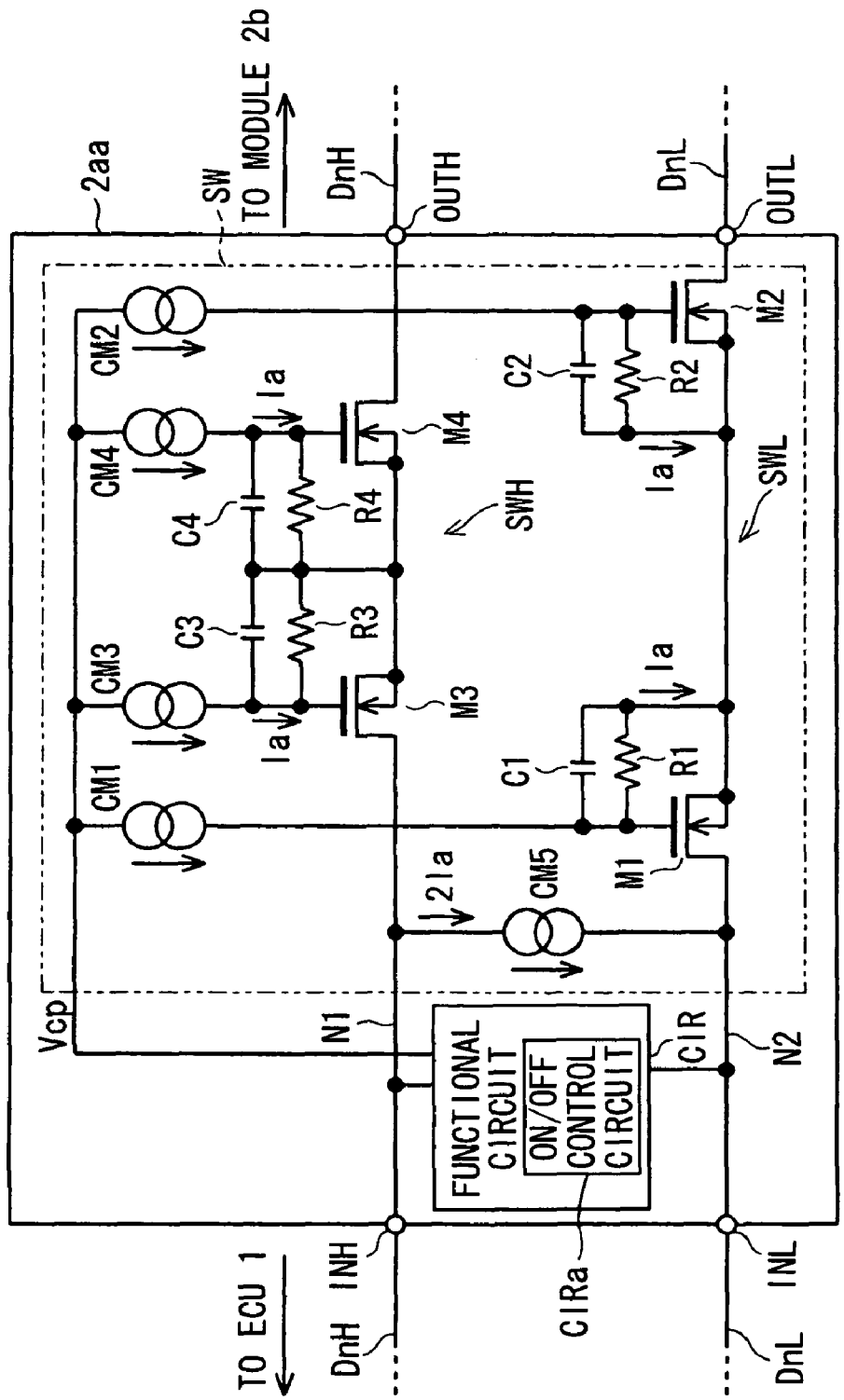
FIG. 2A is a diagram showing an electronic configuration of a switch section according to the first embodiment and FIG. 2B is a diagram showing a detail electronic configuration of the switch section.

As shown in FIG. 2A, the switch section SW includes n-channel metal oxide semiconductor transistors (nMOS transistors) M1-M4, constant current sources CM1-CM5 configured by current mirror circuits, and the resistance elements R1-R4. If an nMOS transistor and a pMOS transistor are configured as similar on-resistance elements, an element forming region of the nMOS transistor is smaller than an element forming region of the pMOS transistor. Thus, the nMOS transistors M1-M4 are provided.

In addition, the nMOS transistors M1-M4 are used because a pair property of on resistances is required when the EMC is taken into consideration. The nMOS transistors M1-M4 are configured so that on-resistances have the same property. The high-side switch SWH includes the nMOS transistors M3 and M4. The low-side switch SWL includes the nMOS transistors M1 and M2.

Between the input terminal INL and the output terminal OUTL of the low-potential side bus DnL, a drain and a source of the nMOS transistor M1 and a source and a drain of the nMOS transistor M2 are coupled in series. The source of the nMOS transistor M1 is coupled in common with the source of the nMOS transistor M2.

Between the gate and the source of the nMOS transistor M1, a resistance element R1 and a capacitor C1 are coupled in parallel. The gate corresponds to a control terminal. Between the gate and the source of the nMOS transistor M2, a resistance element R2 and a capacitor C2 are coupled in parallel. The capacitors C1 and C2 are provided for absorbing a transient change in the voltage.

Figure 2B:
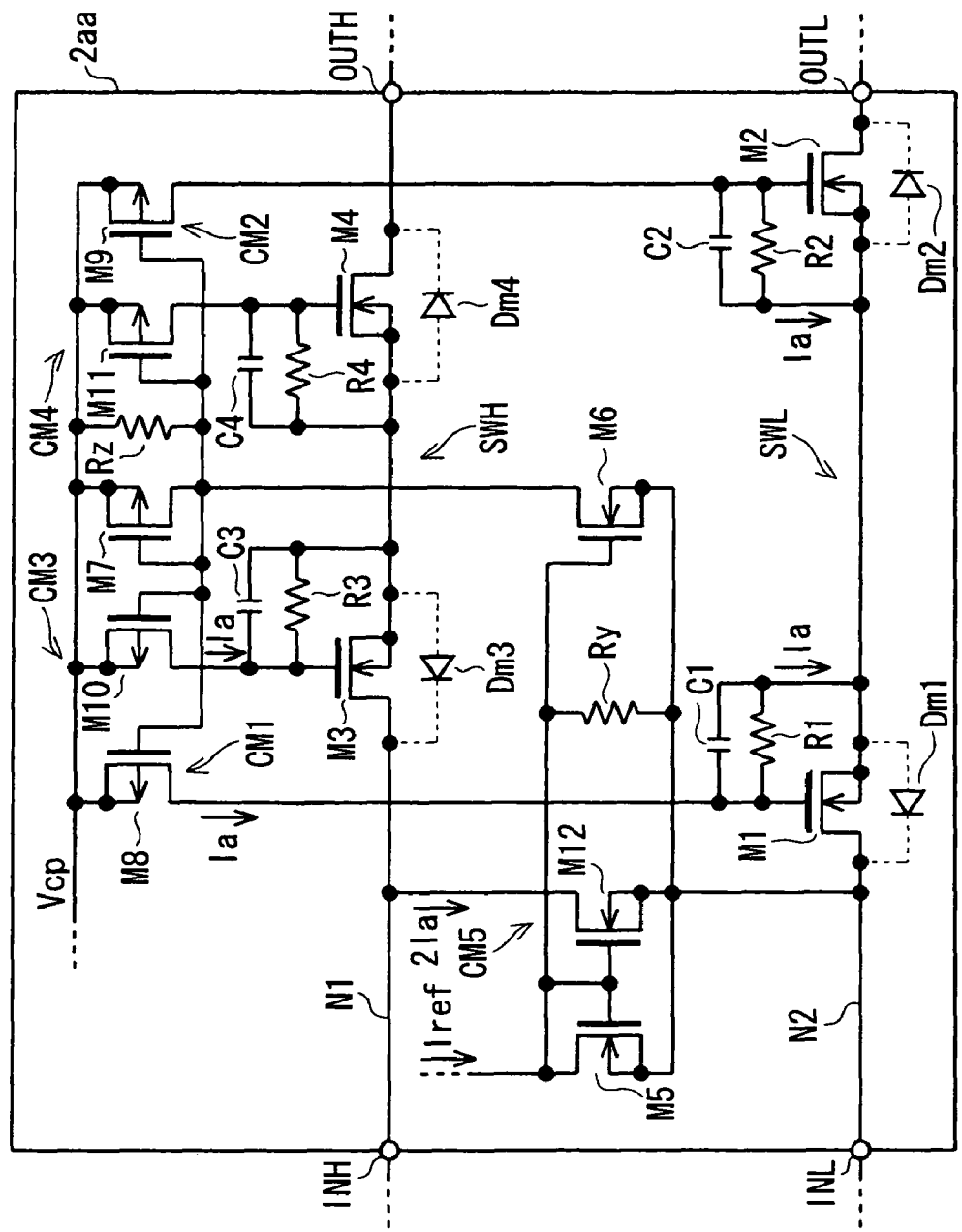

A common connecting point between the resistance element R1 and the gate of the nMOS transistor M1 is coupled with the constant current source CM1. When the constant current source CM1 is applied with the high voltage Vcp from the functional circuit CIR, the constant current source CM1 supplies electric current to the resistance element R1 and the capacitor C1 coupled with the gate of the nMOS transistor M1. As shown in FIG. 2B, the constant current source CM1 includes a pMOS transistor M8 as a current output transistor. A source of the pMOS transistor M8 is coupled with a supply node of the high voltage Vcp. The constant current source CM1 is configured by a current output circuit by a current mirror circuit.

The constant current source CM1 includes nMOS transistors M5 and M6 and pMOS transistors M7 and M8. A gate and a drain of the nMOS transistor M5 are coupled in common with a gate of the nMOS transistor M6. A source of the nMOS transistor M5 is coupled in common with a source of the nMOS transistor M6.

A drain of the nMOS transistor M6 is coupled in common with a gate and a drain of the pMOS transistor M7 and a gate of the pMOS transistor M8, respectively. A source of the pMOS transistor M7 is coupled in common with the source of the pMOS transistor M8.

A resistance element Rz is coupled between the source and the drain of the pMOS transistor M7. A resistance element Ry is coupled between the source and the drain of the nMOS transistor M5. The resistance elements Ry and Rz are provided for stabilizing gate potentials of the nMOS transistor M5 and the pMOS transistor M7 when a reference current Iref is zero. By including the resistance elements Ry and Rz, the constant current sources CM1-CM5 can be controlled by a deenergizing control with a high degree of certainty.

The drain of the PMOS transistor M8 is coupled with the common connecting point of the gate of the nMOS transistor M1 and the resistance element R1. When the functional circuit CIR supplies the reference current Iref to the drain of the nMOS transistor M5, electric current is supplied to the resistance element R1 and the capacitor C1 coupled between the gate and the source of the nMOS transistor M1 due to current mirror functions of the nMOS transistor M6 and the pMOS transistors M7 and M8.

As shown in FIG. 2A, a common connecting point of the resistance element R2 and the gate of the nMOS transistor M2 is coupled with the constant current source CM2. When the constant current source CM2 is applied with the high voltage Vcp from the functional circuit CIR, the constant current source CM2 supplies electric current to the resistance element R2 and the capacitor C2 coupled with the gate of the nMOS transistor M2. As shown in FIG. 2B, the constant current source CM2 has a current output configuration provided by a current mirror circuit. The constant current source CM2 includes a pMOS transistor M9 as a current output transistor. A source of the PMOS transistor M9 is coupled with the supply node of the high voltage Vcp.

As shown in FIG. 2B, a gate of the pMOS transistor M9 is coupled in common with the gate of the PMOS transistor M7. Thus, when the functional circuit CIR supplies the reference current Iref to the drain of the nMOS transistor M5, electric current is supplied to the resistance element R2 and the capacitor C2 coupled between the gate and source of the nMOS transistor M2 due to the current mirror functions of the nMOS transistor M6 and the pMOS transistors M7 and M9.

Between the input terminal INH and the output terminal OUTH of the high-potential side bus DnH, a drain and a source of the nMOS transistor M3 and a source and a drain of the nMOS transistor M4 are coupled in series. The source of the nMOS transistor M3 is coupled in common with the source of the nMOS transistor M4. Between the gate and the source of the nMOS transistor M3, a resistance element R3 and a capacitor C3 are coupled in parallel. Between the gate and the source of the nMOS transistor M4, a resistance element R4 and a capacitor C4 are coupled in parallel. The capacitors C3 and C4 are provided for absorbing a transient change in the voltage.

A common connecting point between the resistance element R3 and the gate of the nMOS transistor M3 is coupled with the constant current source CM3. When the constant current source CM3 is applied with the high voltage Vcp from the functional circuit CIR, the constant current source CM3 supplies electric current to the resistance element R3 and the capacitor C3 coupled with the gate of the nMOS transistor M3.

As shown in FIG. 2B, the constant current source CM3 has a current output configuration provided by a current mirror circuit. The constant current source CM3 includes a pMOS transistor M10 as a current output transistor. A source of the PMOS transistor M10 is coupled with the supply node of the high voltage Vcp. A gate of the pMOS transistor M10 is coupled in common with the gate of the PMOS transistor M7. Thus, when the functional circuit CIR supplies the reference current Iref to the drain of the nMOS transistor M5, electric current is supplied to the resistance element R3 and the capacitor C3 due to the current mirror functions of the nMOS transistor M6 and the PMOS transistors M7 and M10.

A common connecting point between the resistance element R4 and the gate of the nMOS transistor M4 is coupled with the constant current source CM4. When the constant current source CM4 is applied with the high voltage Vcp from the functional circuit CIR, the constant current source CM4 supplies electric current to the resistance element R4 and the capacitor C4 coupled with the gate of the nMOS transistor M4.

As shown in FIG. 2B, the constant current source CM4 has a current output configuration provided by a current mirror circuit. The constant current source CM4 includes a pMOS transistor M11 as a current output transistor. A source of the pMOS transistor M11 is coupled with the supply node of the high voltage Vcp. A gate of the PMOS transistor M11 is coupled in common with the gate of the PMOS transistor M7. Thus, when the functional circuit CIR supplies the reference current Iref to the drain of the nMOS transistor M5, electric current is supplied to the resistance element R4 and the capacitor C4 coupled between the gate and source of the nMOS transistor M4 due to the current mirror functions of the nMOS transistor M6 and the pMOS transistors M7 and M11.

As shown in FIG. 2A, the constant current source CM5 is disposed at a subsequent stage of the functional circuit CIR.

The constant current source CM5 is provided as a current bypass circuit for recovering electric current. The constant current source CM5 is disposed between the nodes N1 and N2 of the pair of buses DnH and DnL. The constant current source CM5 is configured by a current mirror circuit. As shown in FIG. 2B, the constant current source CM5 includes an nMOS transistor M12. A drain and a source of the nMOS transistor M12 is coupled between the nodes N1 and N2. A gate and the source of the nMOS transistor M12 are coupled in common with the gate and the source of the nMOS transistor M5, respectively.

The constant current source CM5 is capable of diverting an electric current Ia to be supplied to the resistance elements R3 and R4 coupled with the high-potential side bus DnH (i.e., electric current 2xIa) to the node N2 of the low-potential side bus DnL. Thereby, the constant current source CM5 prevents the electric current 2xIa from flowing to the ECU 1 and the other modules 2b-2d through the node N1 of the high-potential side bus DnH.

In a case where the electric current respectively flowing to the resistance elements R3 and R4 has the electric current value Ia, the electric current bypassed by the constant current source CM5 is controlled to have the electric current value 2xIa. If the constant current source CM5 is not provided, the electric current Ia flowing to the resistance elements R3 and R4 flows back to the ECU 1 and the modules 2b-2d. Thus, the bus current fluctuates. The fluctuated bus current may cause noise when communication data is transmitted and received between the ECU 1 as the master and the modules 2a-2d as the slaves. Thus, the constant current source CM5 is provided in the present embodiment. In the present case, because the electric current Ia can flow in the slave IC 2aa through the functional circuit CIR, the electric current can be recovered in the slave IC 2aa. Thereby, the electric current Ia does not affect the ECU and the other modules 2b-2d and an adverse effect can be avoided.

Figure 9:
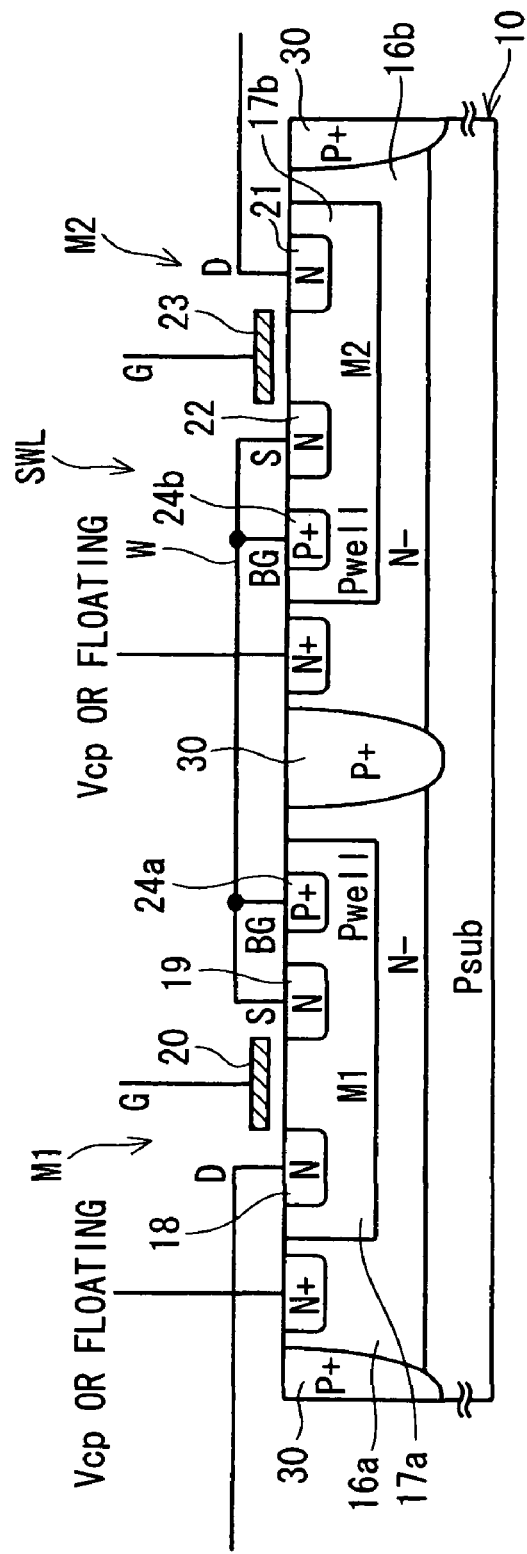
FIG. 9 is a cross-sectional view showing a switch according to a fourth embodiment of the invention.

The module 2a operates by using an electronic potential supplied to the low-potential side bus DnL as a lowest potential, i.e., a substrate potential of the slave IC 2aa. If one of the high-potential side bus DnH and the low-potential side bus DnL adjacent to the output terminals OUTH and OUTL is shorted to a system ground (e.g., chassis ground), the switch section SW is required to be deactivated so that a bus connection having an electric potential lower than a silicon substrate 10 in FIG. 9 is disconnected and the modules 2b-2d disposed on the downstream side are disconnected. The silicon substrate 10 corresponds to a conductive support substrate.

If one of the high-potential side bus DnH and the low-potential side bus DnL is shorted to a high voltage of the battery, the switch section SW is required to be deactivated so that the bus connection is disconnected.

Thus, the switch section SW is configured so that a parasitic element does not restrict a deactivating-operation of the nMOS transistors M1-M4 when the nMOS transistors M1-M4 are deactivate in a case where the bus potentials at the output terminals OUTH and OUTL are lower than the potential at the input terminal INL of the low-potential side bus or in a case where the bus potential at the output terminals OUTH and OUTL are higher than the potential at the input terminal INH of the high-potential side bus.

An exemplary structure of the low-side switch SWL including the nMOS transistors M1 and M2 will now be described with reference to FIG. 4. Although an exemplary structure of the high-side switch SWH including the nMOS transistors M3 and M4 are not shown, the exemplary structure of the high-side switch SWH is similar to the exemplary structure of the low-side switch SWL.

Figure 4:
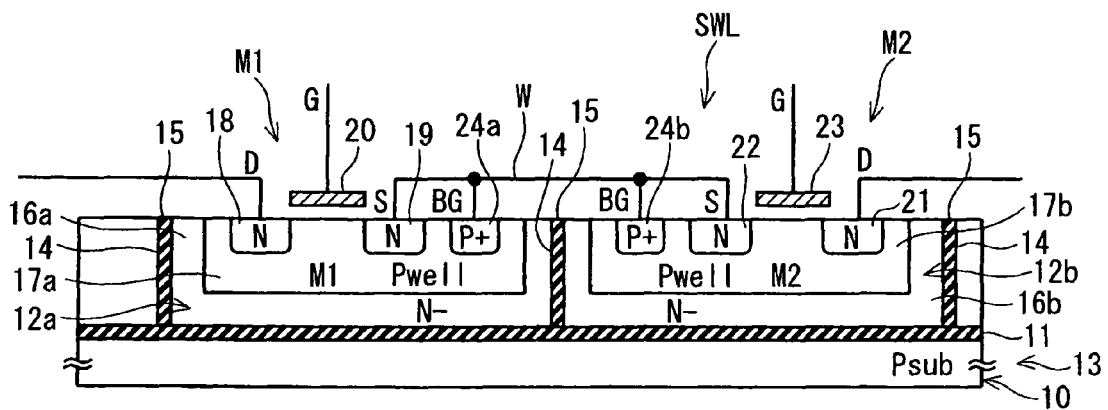
FIG. 4 is a cross-sectional view showing a switch according to the first embodiment.

As shown in FIG. 4, a silicon dioxide layer 11 having a plane shape is disposed on the silicon substrate 10. The silicon dioxide layer 11 is provided for insolating the silicon substrate 10 with element forming regions 12a and 12b provided on the silicon dioxide layer 11. The silicon dioxide layer 11 configurates a silicon on insulator structure (SOI structure) 13. The element forming regions 12a and 12b are separated from each other by a plurality of trenches 14 extending to an upper surface of the SOI structure 13 and an insulating layer 15 filled in the plurality of trenches 14. Thus, the element forming regions 12a and 12b are configured to have island shapes.

The element forming region 12a includes an N type semiconductor layer 16a and a P well 17a disposed on a surface of the N type semiconductor layer 16a. The N type semiconductor layer 16a includes a low-concentration N− impurity. The nMOS transistor M1 is formed at a surface portion of the P well 17a.

The element forming region 12b includes an N type semiconductor layer 16b and a P well 17b disposed on a surface of the N type semiconductor layer 16b. The N type semiconductor layer 16b includes a low-concentration N− impurity. The nMOS transistor M2 is formed on at a surface portion of the P well 17b.

The nMOS transistor M1 includes N type diffusion layers 18 and 19, a gate insulating layer (not shown), and a gate electrode layer 20. The N type diffusion layers 18 and 19 are disposed at the surface portion of the P well 17a so as to be separated from each other. The gate electrode layer 20 is made of polysilicon. The gate electrode layer 20 is formed on a surface of the P well 17a located between the N type diffusion layers 18 and 19 through the gate insulating layer.

The nMOS transistor M2 includes N type diffusion layers 21 and 22, a gate insulating layer (not shown), and a gate electrode layer 23. The N type diffusion layers 21 and 22 are disposed at the surface portion of the P well 17b so as to be separated from each other. The gate electrode layer 23 is made of polysilicon. The gate electrode layer 23 is formed on a surface of the P well 17b located between the N type diffusion layers 21 and 22 through the gate insulating layer. The N type diffusion layers 18 and 21 are configured as drain regions D. The N type diffusion layers 19 and 22 are configured as source regions S.

In the P well 17a, a high-concentration P type semiconductor layer 24a is disposed as a back gate BG. In the P well 17b, a high-concentration P type semiconductor layer 24b is disposed as a back gate BG. The p type semiconductor layers 24a and 24b are electrically coupled with each other between the N type diffusion layers 19 and 22 across the insulating layer 15 through a contact plug (not shown) and an upper layer wire W.

An exemplary operation of the bus connection between the modules 2a-2d will now be described. As shown in FIG. 3, when the master side of the module 2a and the module 2b as the slave located on the downstream side are connected through buses DnH and DnL, an on/off control circuit CIRa of the functional circuit CIR outputs an on-control signal. For example, as shown in FIGS. 2A and 2B, the functional circuit CIR activates the constant current source CM1-CM5 at a time by supplying the reference current Iref and the high voltage Vcp.

Then, the electric current Ia flows from the constant current source CM1-CM4 to the corresponding resistance elements R1-R4. Because the electric current Ia flows to each of the resistance elements R1-R4, a voltage Vgs between the gate and the source of each of the nMOS transistors M1-M4 increases. When the voltage Vgs between the gate and the source of each of the nMOS transistors M1-M4 exceeds a predetermined threshold voltage Vt, each of the nMOS transistors M1-M4 is activated. Thereby, the master side of the module 2a and the module 2b can be connected through the bus DnH and DnL.

As shown in FIG. 5A and FIG. 5B, phases of the voltages of the pair of buses switch periodically between an electricity-supply phase (SP) and a communication phase (CP). The periodical changes in voltages shown in FIG. 5A and FIG. 5B are schematic and are different from actual periodical changes.

During the communication phase CP, a voltage between an electric potential Vh at the high-potential side bus DnH and an electric potential Vl at the low-potential side bus DnL has two voltages levels LD1 and LD2, for example, about 4.5 V and about 1.5 V. The ECU 1 as the master applies voltages having two voltage levels LD1 and LD2 between the buses DnH and DnL so as to be symmetrically with respect to a center electric potential between a maximum electric potential and a minimum electric potential. For example, the maximum electric potential is about 25 V, the minimum electric potential is about 0 V, and the center electric potential is about 12.5 V The modules 2a-2d as the slaves detect the voltages within a predetermined range, e.g., about from 1.5 V to about 4.5 V, with referring the voltage (0 V) of the node N2 of the low-potential side bus DnL. During the communication phase CP, the ECU 1 and the modules 2a-2d transmit and receive data in accordance with a duty ratio of the two potential levels.

During the electricity-supply phase SP, the ECU 1 applies a voltage higher than the two voltage levels during the communication phase CP between the buses DnH and DnL. For example, the ECU 1 applies a constant voltage within a range from about 7 V to about 26.5 V For example, during the electricity-supply phase SP, the ECU 1 applies a power source voltage of about 25 V to the high-potential side bus DnH and the ECU 1 applies a ground potential of about 0 V to the low-potential side bus DnL. At this time, the slave IC 2aa stores the power source electricity at the capacitor CS in the power supply circuit SV in the functional circuit.

When the operation process transitions from the electricity-supply phase SP to the communication phase CP, the slave IC 2aa receives data at the receiving circuit RXC and transmits data from the transmitting circuit TXC by using the stored power supply electricity. Thereby, the module 2a communicates with the ECU 1. As shown in FIG. 5A and FIG. 5B, the electricity-supply phase SP and the communication phase CP are repeated, and thereby the master and the slaves continue to communicate with each other.

Now, cases where at least one of the buses DnL and DnH is shorted to ground (case 2, case 4) or the battery (case 1, case 3) on a downstream side of the module 2b will be considered. In the present cases, the voltages detected at the modules 2a-2d are different from those in a normal communicating state shown in FIG. 5B. Thus, the ECU 1 and the modules 2a-2d are difficult to keep the normal communicating state.

Figure 6:
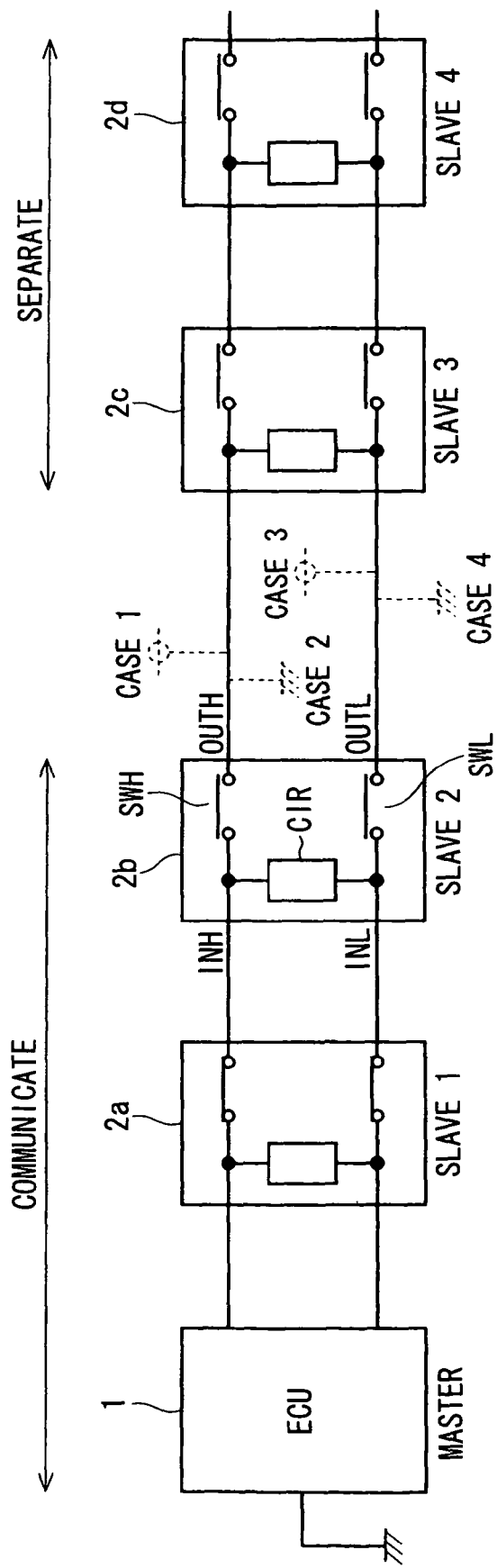
FIG. 6 is a diagram showing the system configuration when an abnormality occurs.

If a potential shown by case 1-case 4 in FIG. 6 is detected at the ECU 1 (master) side of the module 2b, and an abnormal level is detected at the bus located on the downstream side of the module 2b, the switch section SW (SWH, SWL) of the module 2b is deactivated so as to disconnect the both buses DnH and DnL located on the downstream side of the module 2b. At this time, a ground potential (T1) and a battery potential (T2) viewed from the modules 2a and 2b change as shown in FIG. 5C. The ground potential and the battery potential become terminal potentials of the downstream side of the switches SWH and SWL of the module 2b. In the switch configuration of the present embodiment, the switches SWH and SWL of the module 2b can be deactivated with a high degree of certainty even when a voltage range is wide and the voltage includes a voltage lower than 0 V. Thereby, the modules 2a and 2b are restricted from being affected by the change in potential due to the short on the downstream side. Thus, the ECU 1 and the modules 2a and 2b can keep the communicating state.

When the module 2b disconnects the ECU 1 side of the module 2b and the module 2c disposed on the downstream side of the module 2b, the on/off control circuit CIRa of the functional circuit outputs an off-control signal so that the constant current sources CM1-CM5 stop outputting the electric current. Because the electric current does not flow to the resistance elements R1-R4, the voltage Vgs between the gate and the source of each of the nMOS transistors M1-M4 decreases, and the nMOS transistors M1-M4 are deactivated at a time. Thereby, the buses DnH and DnL that couple the ECU 1 side of the module 2b and the module 2c can be disconnected.

As shown in FIG. 4, the low-side switch SWL is formed in the element forming regions 12a and 12b. The element forming region 12a and 12b are provided on the SOI structure 13 and are separated from each other by the insulating layer 15.

In the present case, the silicon dioxide layer 11 is disposed between the nMOS transistors M1 and M2, which configurate the low-side switch SWL, and the silicon substrate 10. Therefore, a parasitic element is not generated in principle due to an insolating function of the silicon dioxide layer 11.

In the N type semiconductor layers 16a and 16b, the trenches 14 extend to the upper surface of the silicon dioxide layer 11. In each of the trenches 14, the insulating layer 15 is filled. Thus, the nMOS transistors M1 and M2 are formed in the element forming regions 12a and 12b that are structurally and electrically insulated from each other by the silicon dioxide layer 11 and the insulating layer 15. Therefore, a parasitic element through the N type semiconductor layers 16a and 16b is not generated in principle due to insolating functions of the silicon dioxide layer 11 and the insulating layer 15.

As shown in dashed lines in FIG. 2B that illustrate equivalent circuits of parasitic elements, in the N type semiconductor layer 16a, a parasitic diode Dm1 is generated between the source and the drain of the nMOS transistor M1. In the N type semiconductor layer 16b, a parasitic diode Dm2 is generated between the source and the drain of the nMOS transistor M2.

The parasitic diode Dm1 is generated between the P type semiconductor layer 24a and the N type diffusion layer 18 in a forward direction. The parasitic diode Dm2 is generated between the P type semiconductor layer 24b and the N type diffusion layer 21 in a forward direction. Thus, as shown in FIG. 2B, the parasitic diodes Dm1 and Dm2 are coupled in opposite directions between the input terminal INL and the output terminal OUTL of the low-potential side bus DnL.

Accordingly, even if the switch section SW is deactivated, a parasitic electric current that flows through the parasitic diode Dm1 and a parasitic electric current that flows through the parasitic diode Dm2 are difficult to be generated. As a result, the buses DnH and DnL located on the downstream side of the module 2b are disconnected with a certainty and the ECU 1 and the modules 2a and 2b can stably communicate with each other. Between the input terminal INH and the output terminal OUTH of the low-potential side bus DnL, parasitic diodes Dm3 and Dm4 are coupled in opposite directions.

In the present switch section SW, the high-side switch SWH is coupled between the input terminal INH and the output terminal OUTH of the high-potential side bus DnH. In addition, the low-side switch SWL is coupled between the input terminal INL and the output terminal OUTL of the low-potential side bus DnL. By deactivating both the switches SWH and SWL, the bus connections between the module 2b and the module 2c can be disconnected. Thus, even when an abnormality occurs in the buses DnH and DnL located on the downstream side of the module 2b, the ECU1 and the modules 2a and 2b can be stably operated.

The low-side switch SWL has the above-described semiconductor element structure, and the nMOS transistors M1 and M2 in the low-side switch SWL are coupled in series so as to have the common source. Thus, the low-side switch SWL can prevent a leak current due to the parasitic element and the low-potential side bus DnL can be disconnected with a high degree of certainty when the low-side switch is deactivated. In a manner similar to the low-side switch SWL, the high-side switch SWH can prevent a leak current due to the parasitic element and the high-potential side bus DnH can be disconnected with a high degree of certainty when the high-side switch SWH is deactivated.

The gate and the source of each of the nMOS transistors M1-M4 are coupled through corresponding one of the resistance elements R1-R4. Thus, by setting the electric currents output from the CM1-CM4 to be zero, the voltage Vgs between the gate and the source of each of the nMOS transistors M1-M4 can be zero with respect to the wide voltage range and the nMOS transistors M1-M4 can be deactivated with a high degree of certainty. Thereby, the bus connections can be disconnected.

The voltage Vgs between the gate and the source of each of the nMOS transistors M1-M4 is determined based on only the electric current Ia generated by the constant current sources CM1-CM4. Thus, pair properties of on-resistances of nMOS transistors M1-M4 can be maintained regardless of the voltage between the buses DnH and DnL.

In a system disclosed in U.S. Pat. No. 5,964,815, a voltage of one side of a pair of buses into which an nMOS transistor is inserted is fixed to ground and a voltage of the other side is configured to be variable. However, when only one side of the pair of buses varies, undesirable radiation may be generated. Thus, it is undesirable that only one side of the pair of buses varies from a viewpoint of the EMC. However, in the switch section SW according to the present embodiment, symmetry of the circuit configurations of the high-potential side bus DnH and the low-potential side bus DnL is maintained. Thus, undesirable radiation can be restricted.

Second Embodiment

Figure 7:
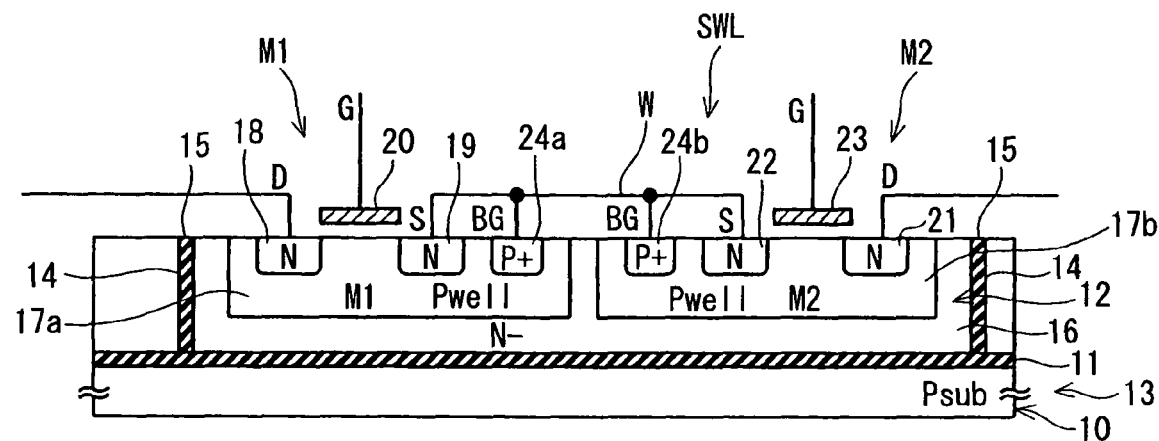
FIG. 7 is a cross-sectional view showing a switch according to a second embodiment of the invention.

A switch section SW according to a second embodiment of the invention will be described with reference to FIG. 7. In each of switches SWH and SWL in the present switch section SW, the trenches 14 and the insulating layer 15 provided in the first embodiment are not provided. Thus, one N type semiconductor layer 16 is formed in one element forming region 12 provided on the silicon dioxide layer 11.

At a surface portion of the one N type semiconductor layer 16, a P well 17a and a P well 17b are disposed so as to be separated from each other. The nMOS transistor M1 is formed in the P well 17a and the nMOS transistor M2 is formed in the P well 17b. The switch section SW according to the present embodiment has similar effects to the switch section SW according to the first embodiment.

Third Embodiment

Figure 8:
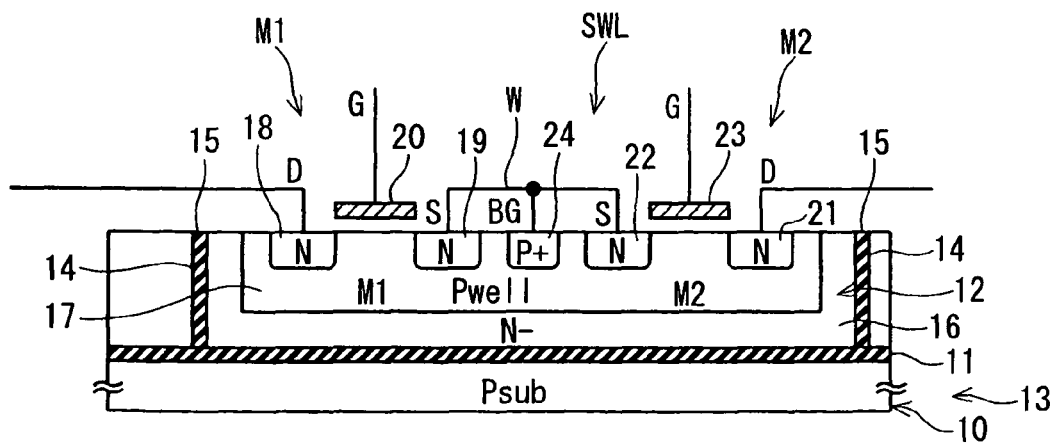
FIG. 8 is a cross-sectional view showing a switch according to a third embodiment of the invention.

A switch section SW according to a third embodiment of the invention will be described with reference to FIG. 8. In each of switches SWH and SWL in the present switch section SW, the two P wells 17a and 17b provided in the first embodiment and the second embodiment are integrated into one P well 17, and the one P well 17 is formed at the surface portion of N type semiconductor layer 16. In addition, the two P type semiconductor layers 24a and 24b provided in the first embodiment and the second embodiment are integrated into one P type semiconductor layer 24. The one P type semiconductor layer 24 is formed at a surface portion of the P well 17. The switch section SW according to the present embodiment has similar effects to the switch sections SW according to the first and second embodiment.

In addition, the N type diffusion layers 19 and 22 functioning as source regions S may be integrated. In the switch sections SW according to the first to third embodiments, trench isolating structures are used for isolating other semiconductor forming regions (not shown), as shown in FIG. 4, FIG. 7, and FIG. 8. Alternatively, an element isolation by a PN junction or an element isolation by an insulating layer such as an oxide layer and a nitride layer may be used.

Fourth Embodiment

A switch section SW according to a fourth embodiment of the invention will be described with reference to FIG. 9. In each of switches SWH and SWL in the present switch section SW, high-concentration P type semiconductor layers 30 are provided instead of the trenches 14 and the insulating layer 15 described in the first embodiment. Furthermore, in the present switch section SW, the SOI structure 13 described in the first embodiment is not applied. The N type semiconductor layers 16a and 16b are disposed on the silicon substrate 10 directly so as to be separated from each other. The P type semiconductor layers 30 are disposed along outer peripheral ends of the N type semiconductor layers 16a and 16b so as to contact sides of the N type semiconductor layers 16a and 16b. The nMOS transistor M1 is formed in the N type semiconductor layer 16a and the nMOS transistor M2 is formed in the N type semiconductor layer 16b.

The P well 17a is formed at an inside part of a surface portion of the N type semiconductor layer 16a. The P well 17b is formed at an inside part of a surface portion of the N type semiconductor layer 16b. The N type semiconductor layers 16a and 16b are disposed between the P type semiconductor layers in a vertical plan direction. Thereby, a PN junction isolating structure is provided.

The functional circuit CIR applies the high voltage Vcp to the N type semiconductor layers 16a and 16b. The high voltage Vcp is greater than a switching operation voltage. Thereby, a reverse bias is applied to a parasitic diode generated between the P well 17a and the N type semiconductor layer 16a and a parasitic diode generated between the P well 17b and the N type semiconductor layer 16b. In the present case, even when the P wells 17a and 17b are structurally coupled with the N type semiconductor layers 16a and 16b, respectively, without through an insulating layer, the P wells 17a and 17b can be electrically isolated. Thus, the nMOS transistor M1 formed in the P well 17a and the nMOS transistor M2 formed in the P well 17b can continue the switching operation without receiving an electronic influence of the silicon substrate 10. As a result, the switch section SW according to the present embodiment has similar effects to the switch sections SW according to the above-described embodiments.

Fifth Embodiment

Figure 10:
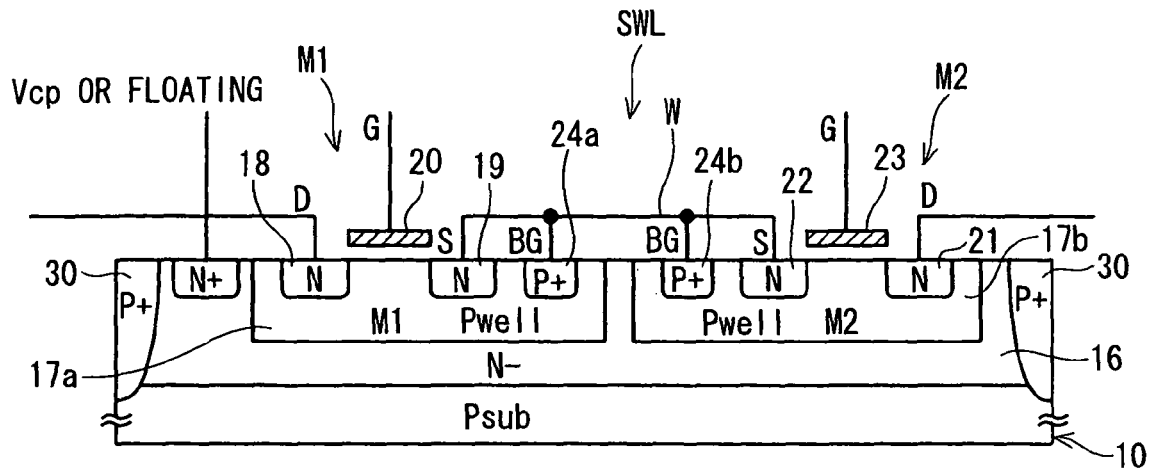
FIG. 10 is a cross-sectional view showing a switch according to a fifth embodiment of the invention.

A switch section SW according to a fifth embodiment of the invention will be described with reference to FIG. 10. In each of switches SWH and SWL in the present switch section SW, one N type semiconductor layer 16 is disposed on the silicon substrate 10. At a surface portion of the N type semiconductor layer 16, the P wells 17a and 17b are formed so as to be separated from each other. The N type semiconductor layer 16 is interposed between the P wells 17a and 17b. The switch section SW according to the present embodiment has similar effects to the switch section SW according to the above-described embodiments.

Sixth Embodiment

Figure 11:
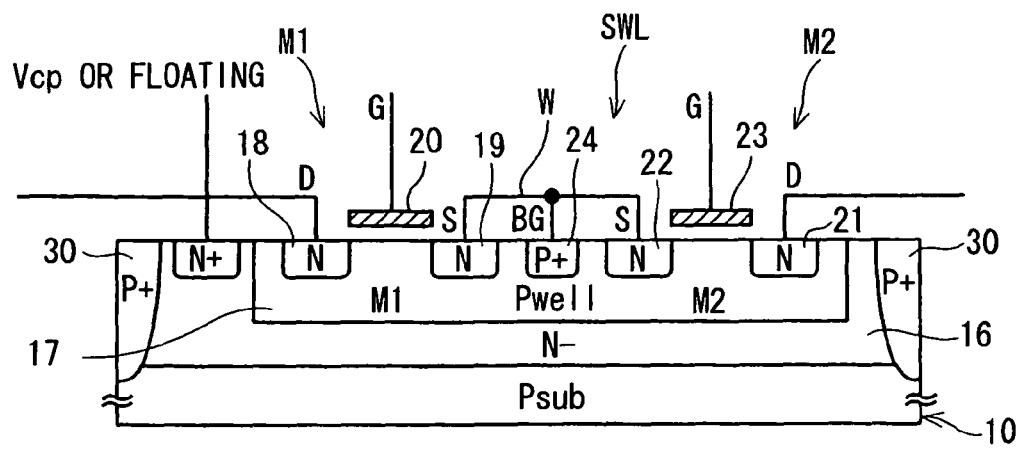
FIG. 11 is a cross-sectional view showing a switch according to a sixth embodiment of the invention.

A switch section SW according to a sixth embodiment of the invention will be described with reference to FIG. 11. In each of switches SWH and SWL in the present switch section SW, the N type semiconductor layer 16 is disposed on the silicon substrate 10, and the P well 17 is formed at a surface portion of the N type semiconductor layer 16. In addition, the P type semiconductor layer 24 is formed at a surface portion of the P well 17. A structure in the P well 17 is similar to the structure in the P well 17 according to the third embodiment. The switch section SW according to the present embodiment has similar effects to the switch sections SW according to the above-described embodiments.

Furthermore, the N type diffusion layers 19 and 22 functioning as the source regions S may be integrated. In the fourth to sixth embodiment, the N type semiconductor layer 16 or the N type semiconductor layers 16a and 16b may not be applied with the high voltage Vcp. That is, the N type semiconductor layer 16 or the N type semiconductor layers 16a and 16b may float. In the present case, a generation of a parasitic current can be limited, for example, by providing a high-concentration embedded layer between the N type semiconductor layer 16 and the P type silicon substrate 10 or between the N type semiconductor layers 16a and 16b and the P type silicon substrate 10.

In the fourth to sixth embodiments, the P type semiconductor layer 30 are provided for isolating the nMOS transistors M1 and M2 and other semiconductor forming regions (not shown). Alternatively, the element isolations may be provided by a trench structure including the trenches 14 and the insulating layer 15, as described in the third embodiment. The element isolation may also be provided by insulating layers such as oxide layers or nitride layers. The element isolation may also be provided by disposing N wells (N type semiconductor layer 16) in the silicon substrate 10 so as to be separated from each other.

Seventh Embodiment

Figure 12:
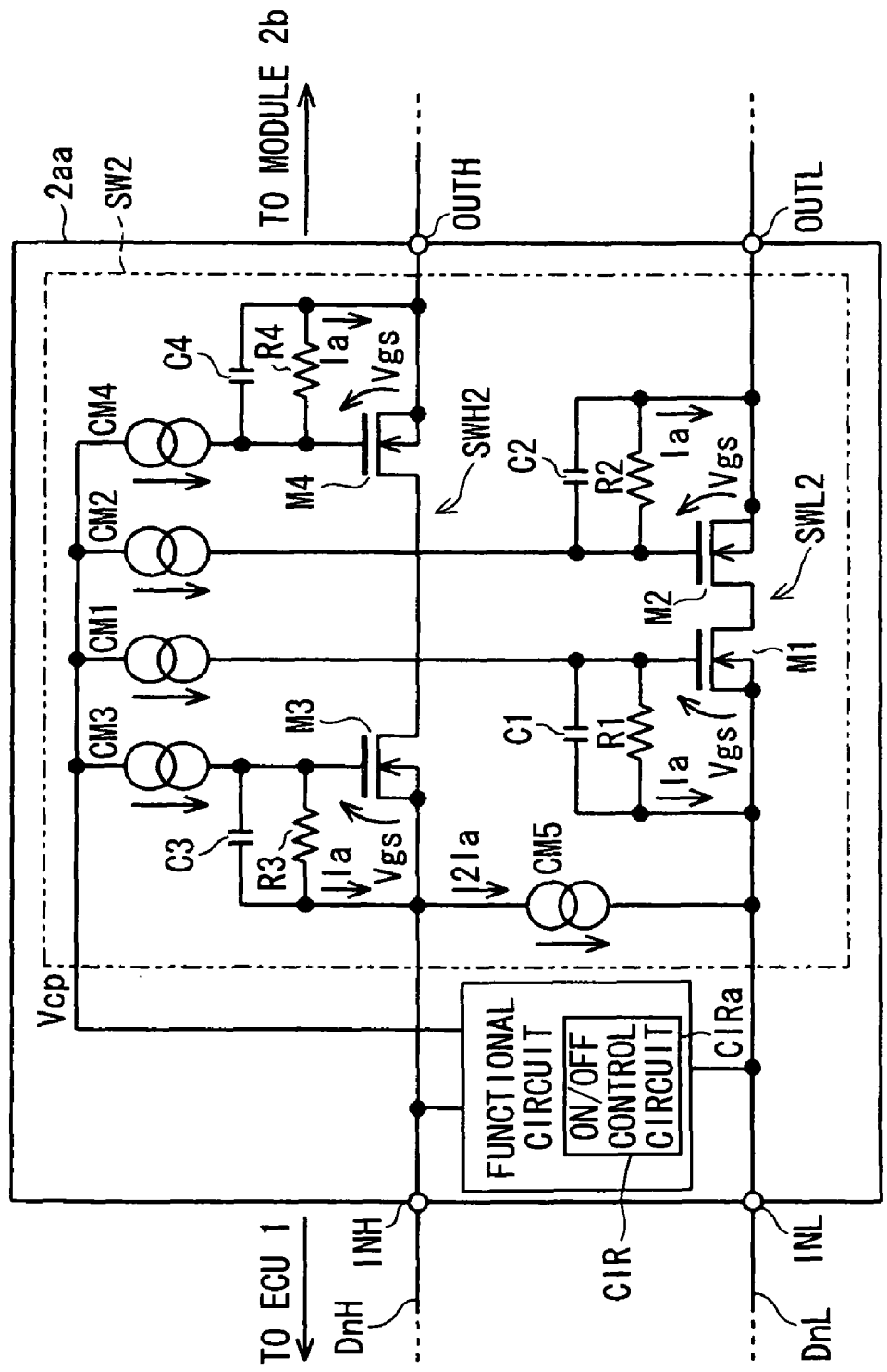
FIG. 12 is a diagram showing an electronic configuration of a switch section according to a seventh embodiment of the invention.

A switch section SW2 according to a seventh embodiment of the invention will be described with reference to FIG. 12-FIG. 14.

The present switch section SW includes the nMOS transistors M1-M4, the constant current sources CM1-CM5 configured by current mirror circuits, and the resistance elements R1-R4. A high-side switch SWH2 includes the nMOS transistors M3 and M4. The nMOS transistor M3 and M4 are coupled so as to have a common drain. Between the input terminal INH and the output terminal OUTH of the high-potential side bus DnH, the source and the drain of the nMOS transistor M3 and the drain and the source of the nMOS transistor M4 are coupled in series.

A low-side switch SWL2 includes the nMOS transistors M1 and M2. The nMOS transistor M1 and M2 are coupled so as to have a common drain. Between the input terminal INL and the output terminal OUTL of the low-potential side bus DnL, the source and the drain of the nMOS transistor M1 and the drain and the source of the nMOS transistor M2 are coupled in series.

The source of the nMOS transistor M1 is coupled with the low-potential side input terminal INL and the source of the nMOS transistor M2 is coupled with the low-potential side output terminal OUTL. The source of the nMOS transistor M3 is coupled with the high-potential side input terminal INH and the source of the nMOS transistor M4 is coupled with the high-potential side output terminal OUTH. Other electronic configuration in the switch section SW2 is similar to the electronic configuration of the switch section SW according to the above-described embodiments.

An exemplary semiconductor structure of the low-side switch SW2 will be described with reference to FIG. 14. In FIG. 14, parasitic elements generated in the semiconductor structure are electrically shown by dashed lines. Also in FIG. 13, parasitic elements generated around the switch section SW2 are electrically shown by dashed lines.

Figure 14:
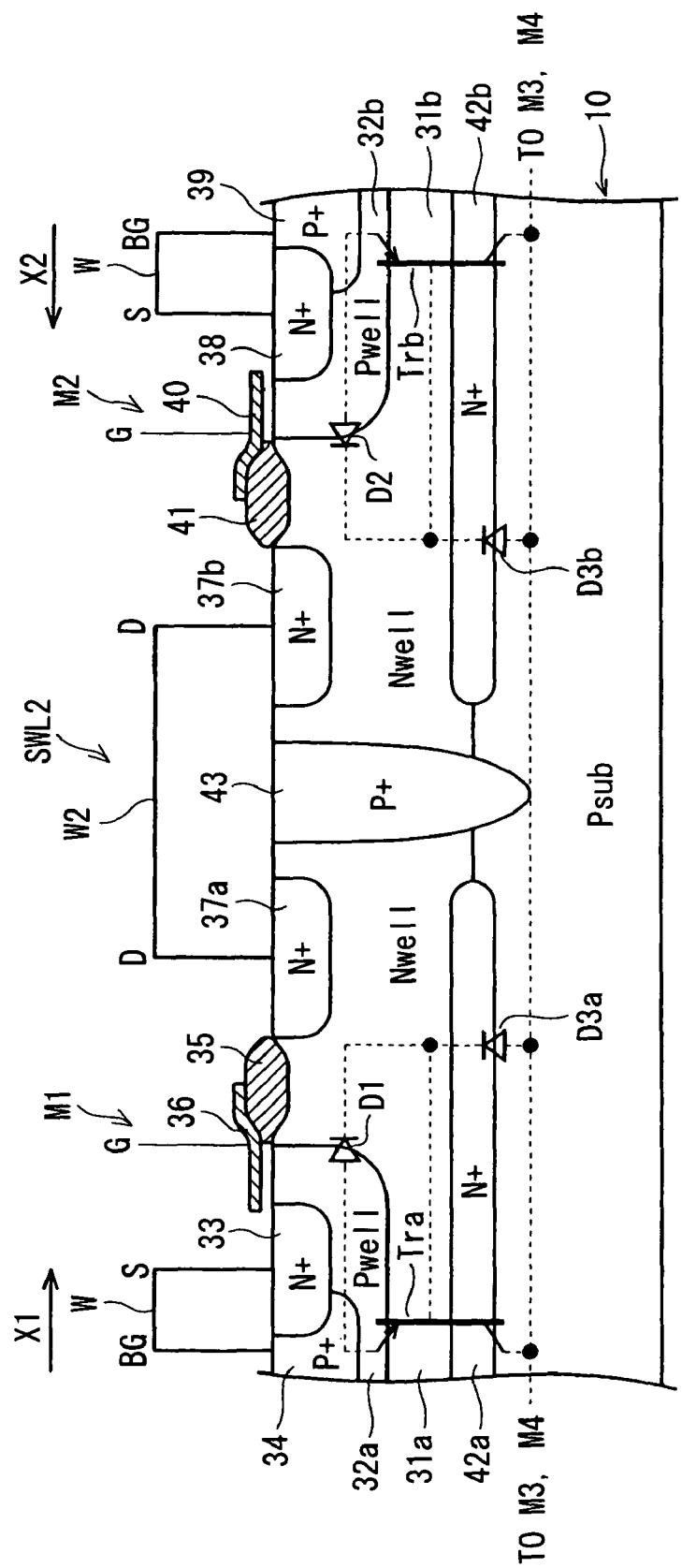
FIG. 14 is a cross-sectional view showing a switch according to the seventh embodiment.

As shown in FIG. 14, at a surface portion of the P type silicon substrate 10 as a conductive support substrate, N type embedded layers 42a and 42b are disposed so as to be separated from each other. An N well 31a is disposed on the silicon substrate 10 through the N type embedded layer 42a. An N well 31b is disposed on the silicon substrate 10 through the N type embedded layer 42b. Between the N wells 31a and 31b, a high-concentration P type semiconductor layer 43 is disposed. In this way, an element isolation structure is provided.

At a surface portion of the N well 31a, a P well 32a is disposed. At a surface portion of the N well 31b, a P well 32b is disposed. The P well 32a and the P well 32b have the same depth.

In the P well 32a, an N type diffusion layer 33 is formed. The N type diffusion layer 33 functions as a source region S of the nMOS transistor M1. A high-concentration P type diffusion layer 34 is disposed adjacent to the N type diffusion layer 33. The P type diffusion layer 34 contacts the N type diffusion layer 33. The P type diffusion layer 34 functions as a contact region of a back gate BG of the nMOS transistor M1. Above the N type diffusion layer 33 and the P type diffusion layer 34, a contact plug (not shown) and an upper layer wire W are disposed. The N type diffusion layer 33 and the P type diffusion layer 34 are electrically coupled with each other through the upper layer wire W. In this way, the source region S and the back gate BG of the nMOS transistor M1 are electrically coupled.

A field oxide layer 35 is disposed at a surface portion of the N well 31a so as to be located on a side of the P well 32a in a direction X1 that is approximately parallel to the surface of the silicon substrate 10. On a side of the N type diffusion layer 33, a gate electrode layer 36 is disposed on a surface of the P well 32a through a gate insulation layer (not shown). The gate electrode layer 36 is made of polysilicon. The gate electrode layer 36 extends to above the field oxide layer 35. The field oxide layer 35 is provided for maintaining a high breakdown voltage. The gate electrode layer 36 is disposed above the P well 32a and N well 31a through the gate insulating layer. The N well 31a functions as a drain region of the nMOS transistor M1.

An N type diffusion layer 37a is disposed at the surface portion of the N well 31a so as to be located on a side of the field oxide layer 35 in the direction X1. The N type diffusion layer 37a functions as a drain contact region of the nMOS transistor M1. In this way, nMOS transistor M1 includes the semiconductor layers 31a, 32a, 33, 34, 35, 36, and 37a.

In the P well 32b, an N type diffusion layer 38 is formed. The N type diffusion layer 38 functions as a source region S of the nMOS transistor M2. A high-concentration P type diffusion layer 39 is disposed adjacent to the N type diffusion layer 38. The P type diffusion layer 39 contacts the N type diffusion layer 38. The P type diffusion layer 39 functions as a contact region of a back gate BG of the nMOS transistor M2. Above the N type diffusion layer 38 and the P type diffusion layer 39, a contact plug (not shown) and an upper layer wire W are disposed. The N type diffusion layer 38 and the P type diffusion layer 39 are electrically coupled with each other through the upper layer wire W. In this way, the source S and the back gate BG of the nMOS transistor M2 are electrically coupled.

A field oxide layer 41 is disposed at a surface portion of the N well 31b so as to be located on a side of the P well 32b in an X2 direction that is approximately parallel to the surface of the silicon substrate 10. On a side of the N type diffusion layer 38 in the X2 direction, a gate electrode layer 40 is disposed on a surface of the P well 32b through a gate insulation layer (not shown). The gate electrode layer 40 is made of polysilicon. The gate electrode layer 40 extends to over the field oxide layer 41. The field oxide layer 41 is provided for maintaining a high breakdown voltage. The gate electrode layer 40 is disposed above the P well 32b and N well 31b through the gate insulating layer.

The N well 31b functions as a drain region of the nMOS transistor M2. An N type diffusion layer 37b is disposed at the surface portion of the N well 31b so as to be located on a side of the field oxide layer 41 in the X2 direction. The N type diffusion layer 37b functions as a drain contact region of the nMOS transistor M2. In this way, nMOS transistor M2 includes the semiconductor layers 31b, 32b, 37b, 38, 39, 40, and 41.

The high-concentration N type semiconductor layer 37a in the N well 31a and the high-concentration N type semiconductor layer 37b of the N well 31b are electrically coupled with each other through a contact plug (not shown) and an upper layer wire W2.

Figure 13:
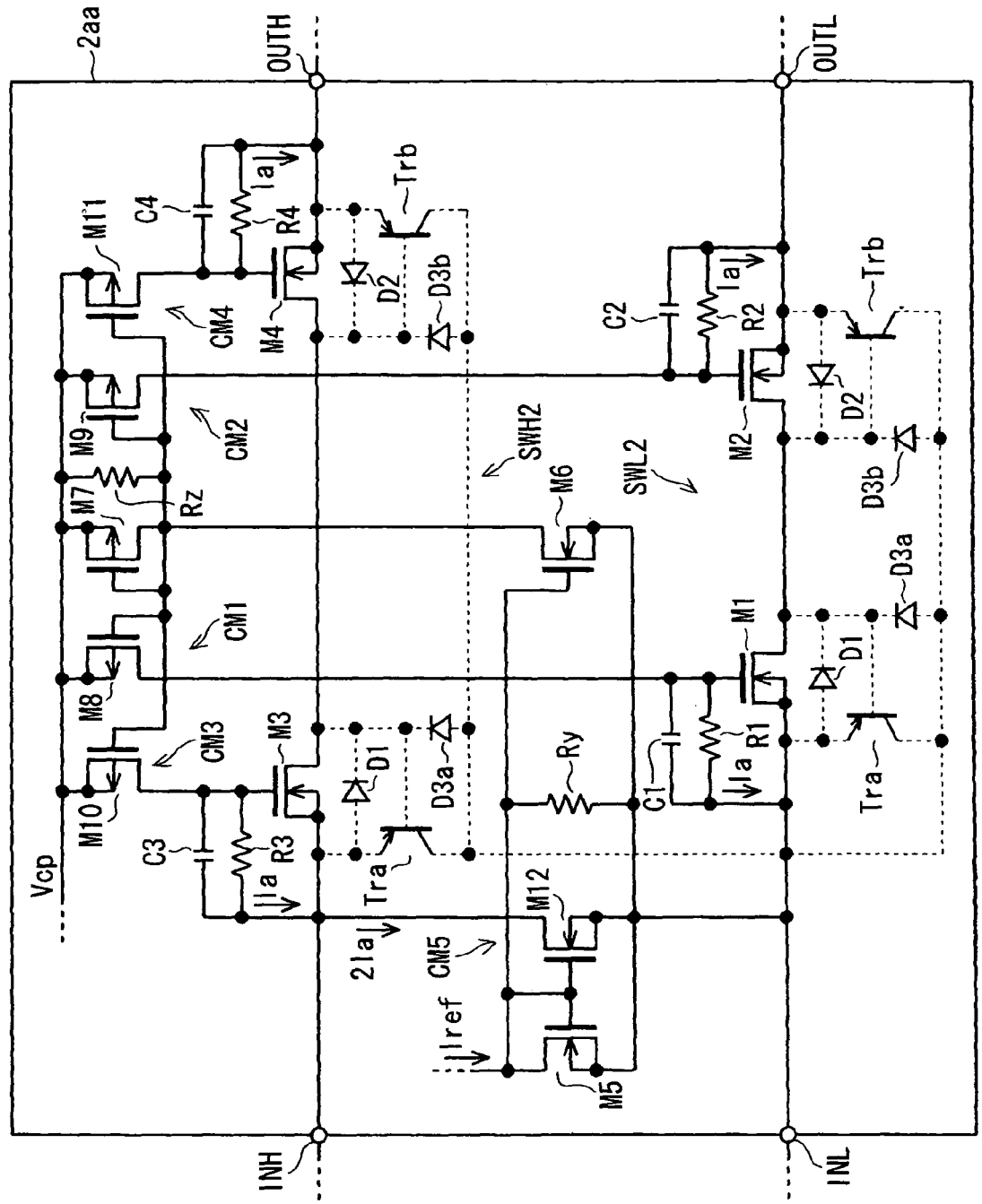
FIG. 13 is a diagram showing a detail electronic configuration of the switch section according to the seventh embodiment.

As shown in FIG. 13 and FIG. 14, a parasitic diode D1 is generated between the P well 32a and the N well 31a and a parasitic diode D2 is generated between the P well 32b and the N well 31b. Between a Psub layer of the silicon substrate 10 and the N type embedded layer 42a, a parasitic diode D3a is generated in a forward direction. Between the Psub layer of the silicon substrate 10 and the N type embedded layer 42b, a parasitic diode D3b is generated in a forward direction. Among the P well 32a, the N well 31a and the Psub layer of the silicon substrate 10, a PNP parasitic transistor Tra is generated. Among the P well 32b, the N well 31b and the Psub layer of the silicon substrate 10, a PNP parasitic transistor Trb is generated.

The parasitic diode D3a is diode-connected between the Psub layer of the silicon substrate 10 and the N well 31a by a PN junction. The parasitic diode D3b is diode-connected between the Psub layer of the silicon substrate 10 and the N well 31b by a PN junction. The parasitic diodes D1 and D2 are generated in the opposite direction to the parasitic diodes D3a and D3b. Thus, a passage in which a parasitic current flows is disconnected. Thereby, when the nMOS transistors M1 and M2 are attempted to be deactivated, the parasitic current is difficult to flow. As a result, when the nMOS transistors M-M4 are attempted to be deactivated, the deactivated state can be maintained.

When the bus connection on the downstream side of the switch section SW2 is attempted to be disconnected, the low-side switch SWL2 can be deactivated with a certainty while restricting a generation of a parasitic leak even if the potentials at the downstream-side buses DnL and DnH become lower than the ground potential of the module.

The low-side switch SWL2 includes the nMOS transistors M1 and M2 that are coupled in series so as to have the common drain. The high-side switch SWH2 includes the nMOS transistors M3 and M4 that are coupled in series so as to have the common drain. Thus, the electric current passage provided through the parasitic elements can be disconnected, the leak current can be restricted, and the switches SWL2 and SWH2 can be disconnected with a certainty.

In the nMOS transistor M1, a conducting direction of the parasitic diode D1 is opposite to a conducting direction of the parasitic diode D3a. In the nMOS transistor M2, a conducting direction of the parasitic diode D2 is opposite to a conducting direction of the parasitic diode D3b. Thus, the leak current due to the parasitic elements can be restricted, and the switches SWL2 and SWH2 can be disconnected with a certainty.

The N type embedded layers 42a and 42b may be provided as necessary. Instead of the N type embedded layers 42a and 42b, high-concentration P type embedded layers may be provided. In a manner similar to the above-described embodiments, the N wells 31a and 31b may be integrated without providing the P type semiconductor layer 43. The N type semiconductor layers 37a and 37b and the N type embedded layers 42a and 42b may also be integrated.

Eighth Embodiment

Figure 15:
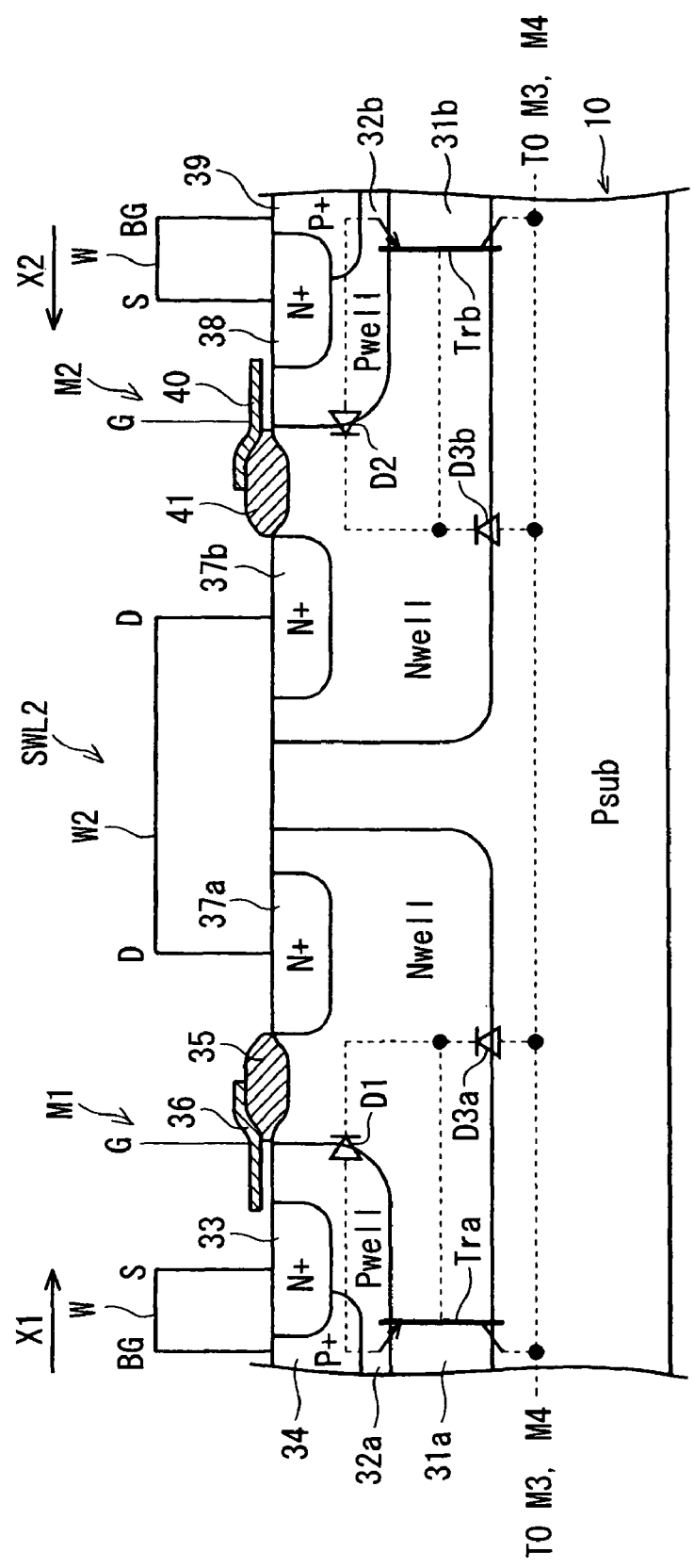
FIG. 15 is a cross-sectional view showing a switch according to an eighth embodiment of the invention.

A switch section SW2 according to an eighth embodiment of the invention will be described with reference to FIG. 15. In each of switches SWL2 and SWH2 in the present switch section SW2, the N type embedded layers 42a and 42b and the P type semiconductor layer 43 provided in the seventh embodiment are not provided at the surface portion of the silicon substrate 10, as shown in FIG. 15. An upper surface of the silicon substrate 10 is exposed to an outside as a P type semiconductor layer. The N wells 31a and 31b are disposed on the opposite side of the P type semiconductor layer so as to be separated from each other. The switch section SW2 according to the present embodiment has similar effects to the above-described embodiments.

As shown by the N type embedded layers 42a and 42b in the seventh embodiment, high impurity-concentration layers may be provided between the silicon substrate 10 and the N well 31a and between the silicon substrate 10 and the N well 31b, for example, by providing semiconductor embedded layers having high impurity concentration. The impurity may be one of a P type and an N type. In the present case, the leak current can be effectively restricted.

Ninth Embodiment

Figure 16:
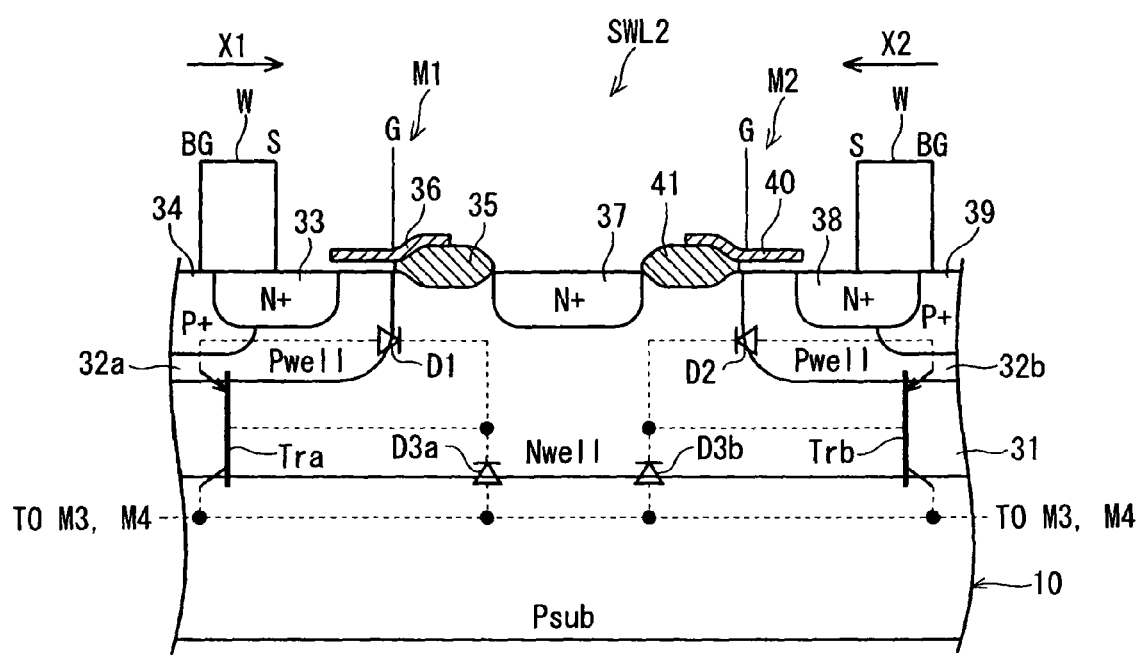
FIG. 16 is a cross-sectional view showing a switch according to a ninth embodiment of the invention.

A switch section SW2 according to a ninth embodiment of the invention will be described with reference to FIG. 16. In each of switches SWL2 and SWH2 in the present switch section SW2, the N well 31a and the N well 31b provided in the eighth embodiment are integrated into an N well 31. In addition, the N type semiconductor layers 37a and 37b provided in the eighth embodiment are integrated into an N type semiconductor layer 37. The present switch section SW2 has similar effects to the above-described embodiments.

Also in the present embodiment, a high-impurity concentration layers may be provided between the silicon substrate 10 and the N well 31, for example, by providing a semiconductor embedded layer having high impurity concentration.

The impurity may be one of a P type and an N type. In the present case, the leak current can be effectively restricted.

In a manner similar to the above-described embodiments, element isolations in the seventh to ninth embodiment may be provided by an SOI structure, a trench structure including trenches and an insulating layer filled in the trenches, or an insulating layer such as an oxide layer and a nitride layer.

Tenth Embodiment

Figure 17:
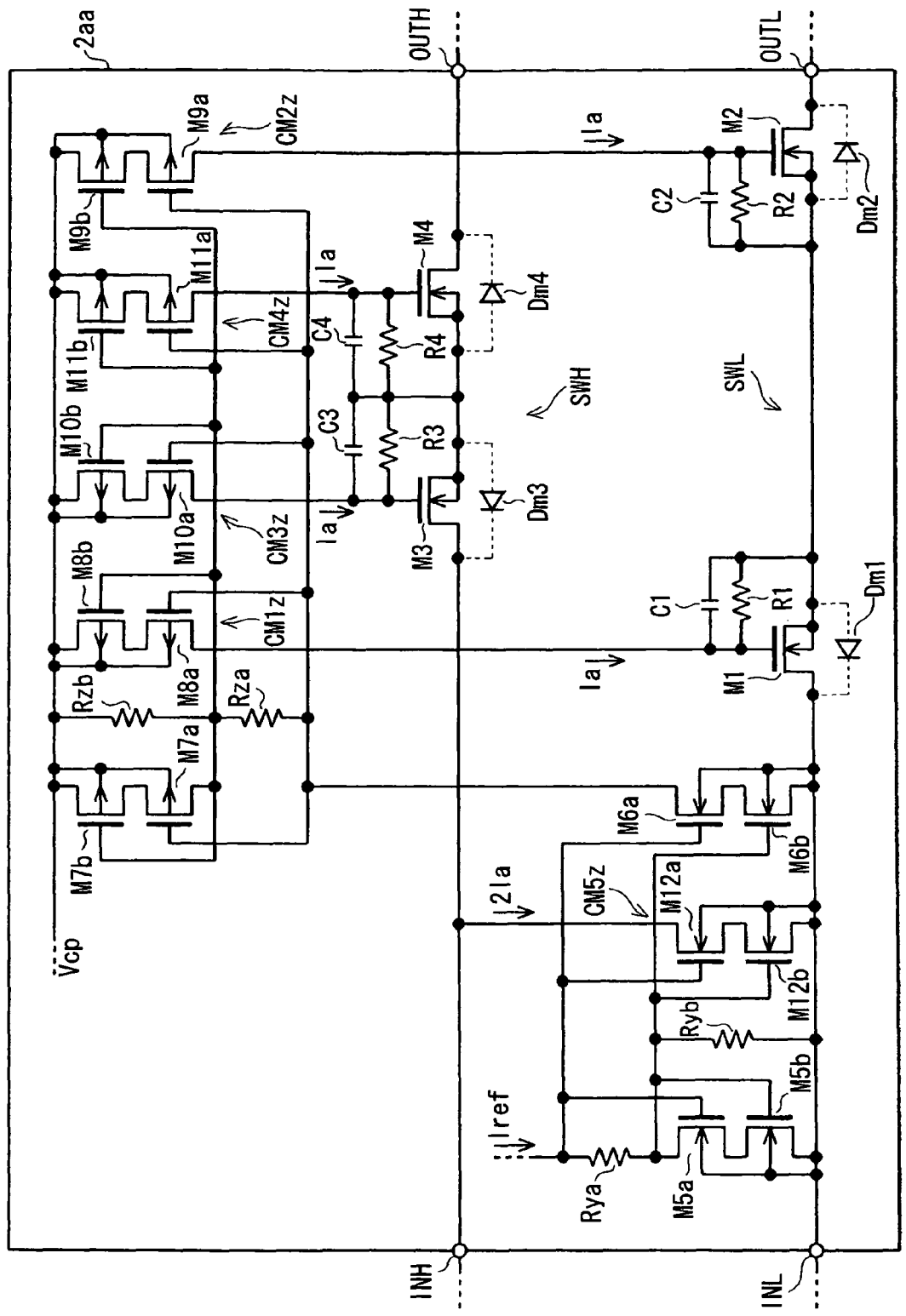
FIG. 17 is a cross-sectional view showing a switch according to a tenth embodiment of the invention.

A switch section SW according to a tenth embodiment of the invention will be described with reference to FIG. 17. In the present switch section SW, each of the MOS transistors M5-M12, which are provided in the first embodiment for constituting the constant current sources CM1-CM5, is configured by two MOS transistors that are cascade-connected in series. That is, the MOS transistor M5 is configured by MOS transistors M5a and M5b that are cascade-connected in series. Similarly, the MOS transistor M6 is configured by MOS transistors M6a and M6b, the MOS transistor M7 is configured by MOS transistors M7a and M7b, the MOS transistor M8 is configured by MOS transistors M8a and M8b, the MOS transistor M9 is configured by MOS transistors M9a and M9b, the MOS transistor M10 is configured by MOS transistors M10a and M10b, the MOS transistor M11 is configured by MOS transistors M11a and M11b, and the MOS transistor M12 is configured by MOS transistor M12a and M12b. The MOS transistors M5a-M12b configurates constant current sources CM1z-CM5z in place of the constant current sources CM-CM5.

The present switch section SW further includes resistance elements Rya, Ryb, Rza, Rzb for generating bias voltages required for cascade operations. Because the present switch section SW includes the cascade-connected constant current source CM1z-CM5z, a performance of the switch section SW can be improved.

Eleventh Embodiment

Figure 18A:
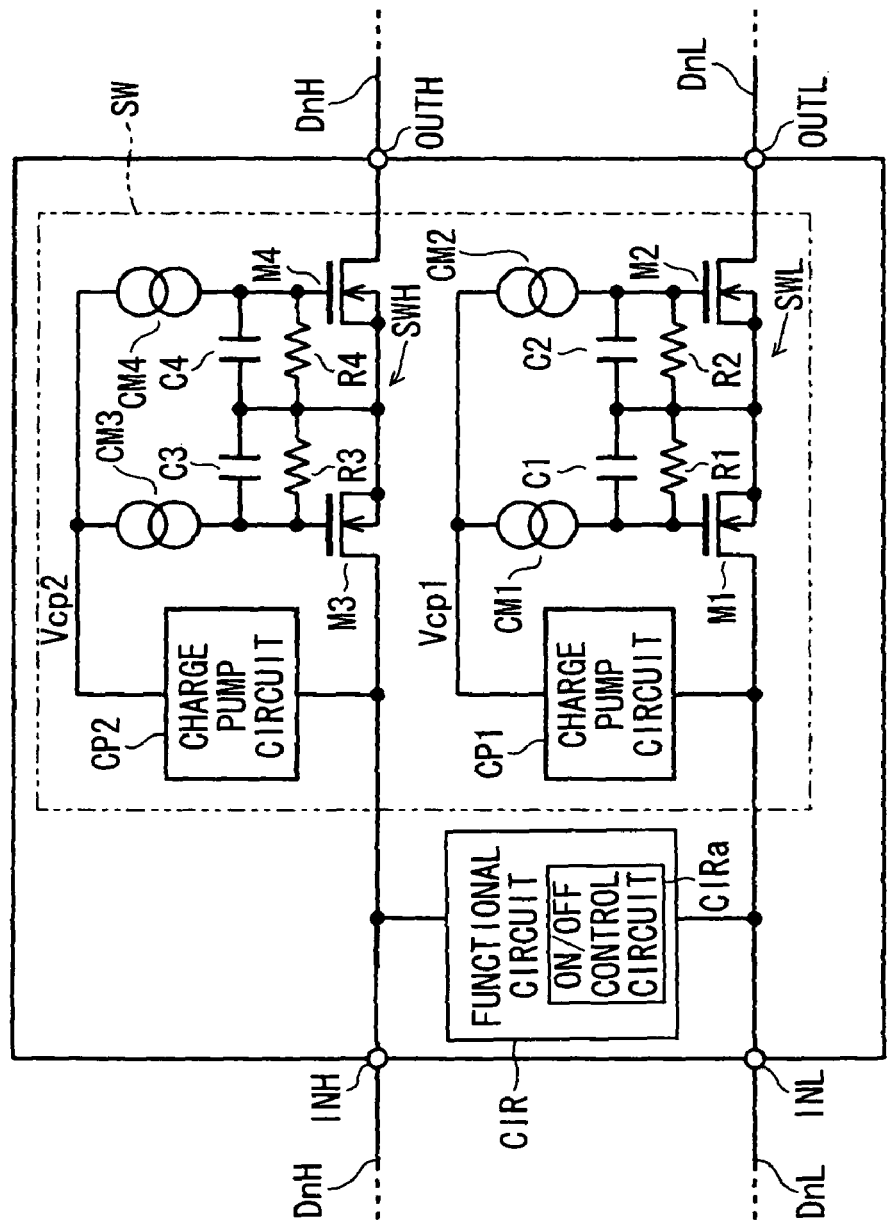
FIG. 18A is a diagram showing an electronic configuration of a switch section according to an eleventh embodiment of the invention and FIG. 18B is a diagram showing a detail electronic configuration of the switch section.

A switch section SW according to an eleventh embodiment of the invention will be described with reference to FIG. 18A and FIG. 18B. In the present switch section SW, a charge pump circuits CP1 and CP2 are provided for driving the low-side switch SWL and the high-side switch SWH instead of providing the constant current source CM5 for recovering electric current in the high-potential side bus DnH.

The charge pump circuit CP1 is electrically coupled with the input terminal INL of the low-potential side buses DnL. The charge pump circuit CP1 increases the electronic potential of the low-potential side bus DnL and supplies the increased voltage Vcp1 to the constant current sources CM1 and CM2. The charge pump circuit CP2 is electrically coupled with the input terminal INH of the high-potential side buses DnH. The charge pump circuit CP2 increases the electronic potential of the high-potential side bus DnH and supplies the increased voltage Vcp2 to the constant current sources CM3 and CM4.

Figure 18B:
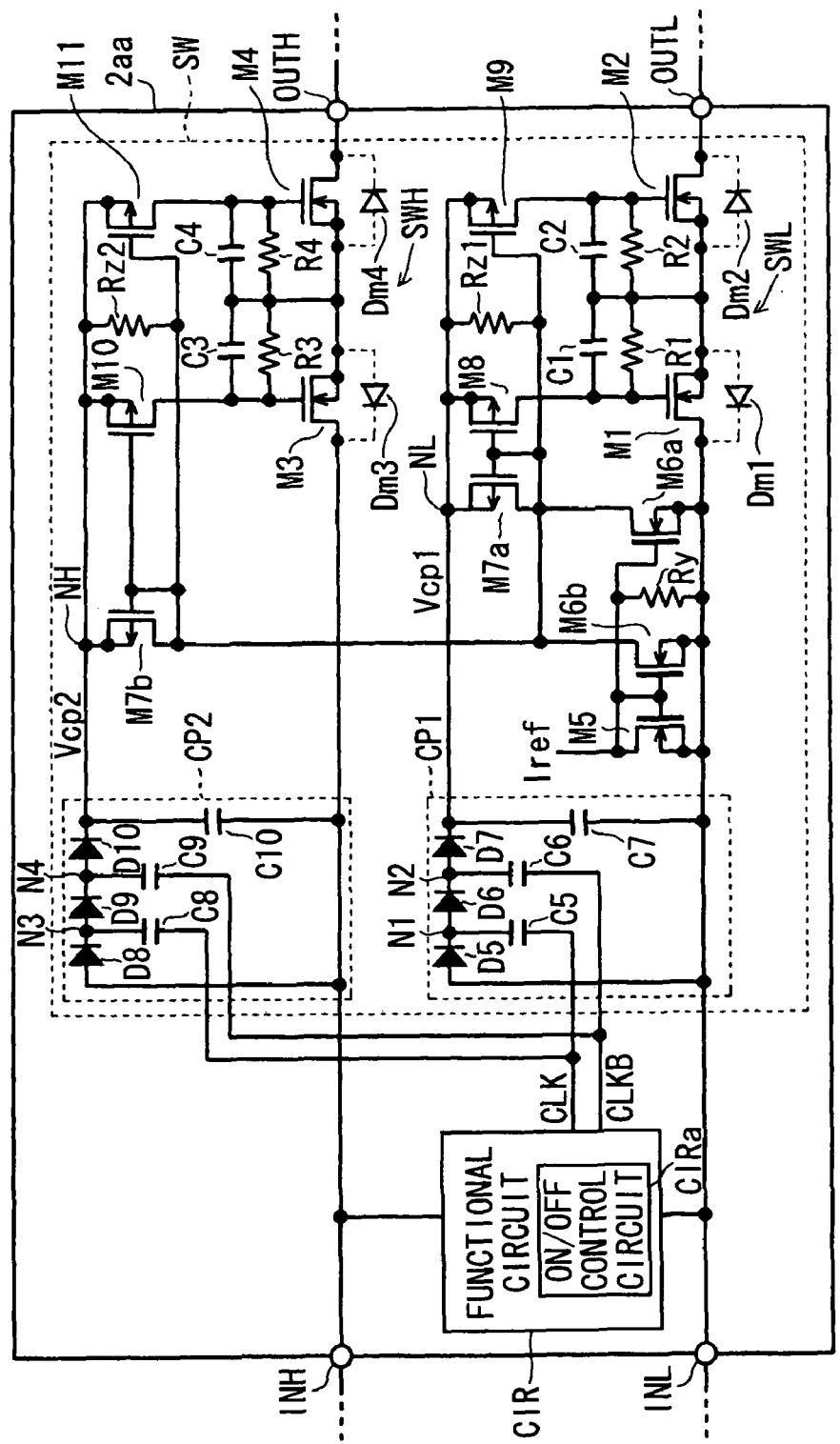

As shown in FIG. 18B, the charge pump circuit CP1 includes diodes D5-D7 and capacitors C5-C7. Between the input terminal INL and an electricity-supply node NL for supplying electricity to the constant current source CM1 and CM2, the diodes D5-D7 are coupled in series in a forward direction. A common connecting point of the diodes D5 and D6 is shown by a node N1 and a common connecting point of the diodes D6 and D7 is shown by a node N2. The functional circuit CIR transmits a clock signal CLK to the node N1 through the capacitor C5. In addition, the functional circuit CIR transmits a clock signal CLKB to the node N2 through the capacitor C6. The clock signal CLK and the clock signal CLKB have the same frequency and opposite phases. Between the electricity-supply node NL and the input terminal INL, the capacitor C7 is coupled for stably maintaining a voltage of the electricity-supply node NL with respect to the input terminal INL.

The constant current source CM1 configured by a current mirror circuit includes nMOS transistors M5 and M6a and PMOS transistors M7a and M8. A gate and a drain of the nMOS transistor M5 are coupled in common with a gate of the nMOS transistor M6a. A source of the nMOS transistor M5 is coupled in common with a source of the nMOS transistor M6a. A drain of the nMOS transistor M6a is coupled in common with a gate and a drain of the pMOS transistor M7a and a gate of the pMOS transistor M8.

A source of the PMOS transistor M7a is coupled in common with a source of the PMOS transistor M8, and the common connecting point becomes the electricity-supply node NL of the constant current source CM1. A resistance element Rz1 is coupled between the source and the drain of the pMOS transistor M7a. A resistance element Ry is coupled between the source and the drain of the nMOS transistor M5. When the functional circuit CIR supplies the reference current Iref to the drain of the nMOS transistor M5, the electric current is supplied to the resistance element R1 coupled between the gate and the source of the nMOS transistor M1 and the capacitor C1 by current mirror functions of the MOS transistors M6a, M7a, and M8. The constant current source CM2 includes the nMOS transistors M5 and M6a and the pMOS transistors M7a and M9. Electronic connections in the constant current source CM2 is almost similar to those in the constant current source CM1. Thus, a description of the electronic connections in the constant current source CM2 is omitted.

The charge pump circuit CP2 includes diodes D8-D10 and capacitors C8-C10. Between the input terminal INH and an electricity-supply node NH for supplying electricity to the constant current source CM3 and CM4, the diodes D8-D10 are coupled in series in a forward direction. A common connecting point of the diodes D8 and D9 is shown by a node N3 and a common connecting point of the diodes D9 and D10 is shown by a node N4. The functional circuit CIR transmits the clock signal CLK to the node N3 through the capacitor C8. In addition, the functional circuit CIR transmits the clock signal CLKB to the node N4 through the capacitor C9. Between the electricity-supply node NH and the input terminal INH, the capacitor C10 is coupled for stably maintaining a voltage of the electricity-supply node NH with respect to the input terminal INH.

The constant current source CM3 configured by a current mirror circuit includes the nMOS transistors M5 and M6b and the pMOS transistors M7b and M10. The constant current source CM4 configured by a current mirror circuit includes the nMOS transistors M5 and M6b and the pMOS transistors M7b and M11. Electronic connections in the constant current sources CM3 and CM4 are almost similar to those in the constant current source CM1. Thus, a description of the electronic connections in the constant current sources CM3 and CM4 is omitted.

When the charge pump circuit CP2 receives the clock signals CLK and the CLKB, the charge pump circuit CP2 repeats the following actions. In a first state where the clock signal CLK is at a low level and the clock signal CLKB is at a high level, electric current flows from the input terminal INH to the capacitor C8 through the diode D8, and the electric current is stored at the capacitor C3. In a second state where the clock signal CLK is at a high level and the clock signal CLKB is at a low level, electric charge stored at the capacitor C8 flows to the capacitor C9 through the diode D9, and the electric charge is stored at the capacitor C9. Thereby, the voltage is increased.

In a third state where the clock signal CLK is at the low level and the clock signal CLKB is at the high level, in addition to the action in the first state, the electric charge stored in the capacitor C9 flows to the capacitor C10 through the diode D10, and the electric charge is stored at the capacitor C10. Thereby, the voltage is further increased.

In a fourth state where the clock signal CLK is at the high level and the clock signal CLKB is at the low level, the action in the second state is performed. Then, the actions in the third state and the fourth state are repeated for increasing the voltage. The voltage Vcp2 stored at the capacitor C10 is supplied to the MOS transistors M10 and M11 that constitutes the constant current sources CM3 and CM4. When the high-side switch SWH is activated, the constant current is supplied from the constant current sources CM3 and CM4 to the resistance elements R3 and R4.

Actions of the charge pump circuit CP1 are similar to the above-described actions of the charge pump circuit CP2. Thus, a description about the charge pump circuit CP1 is omitted. The frequency of the clock signals CLK and CLKB is set to be sufficiently larger than a maximum frequency of signal variation flowing in the buses DnH and DNL. Thereby, when the charge pump circuits CP1 and CP2 increase the voltages Vcp1 and Vcp2, a variation with respect to a target potential based on a variation in an original potential can be restricted.

In the present switch section SW, the charge pump circuit CP1 increases the potential of the low-potential side bus DnL as the original potential and supplies the increased voltage Vcp1 to the constant current sources CM1 and CM2. In addition, the charge pump circuit CP2 increases the potential of the high-potential side bus DnH as the original potential and supplies the increased voltage Vcp2 to the constant current sources CM3 and CM4. Thus, the electric current circulates in the module 2a and the electric current in the module 2a is difficult to flow to the other modules 2b-2d. Thereby, the electric current in the module 2a does not affect the other modules 2b-2d.

For recovering the electric current of the high-potential side bus, only the charge pump circuit CP2 is required to be provided to the side of the high-potential side bus DnH and the charge pump circuit CP1 may not be provided to the side of the low-potential side bus DnL. However, in view of the EMC, the charge pump circuit CP1 may be provided to the side of the low-potential side bus DnL for restricting undesirable radiation. When both of the charge pump circuits CP1 and CP2 are provided, noise generated at the charge pump circuit CP1 and noise generated at the charge pump circuit CP2 counteract each other, and thereby undesirable radiation can be restricted.

Other Embodiments

Although the present invention has been fully described in connection with the preferred embodiments thereof with reference to the accompanying drawings, it is to be noted that various changes and modifications will become apparent to those skilled in the art. For example, the capacitors C1-C4 may be provided as necessary.

The above-described embodiments are described as used for the bus switch, as an example. Alternatively, the above-described embodiments may be applied to an electronic switch for switching energization and deenergization, for example. In the present case, the electronic switch may include one switching element coupled between an input terminal and an output terminal of a conductive line and the switching element may have an electronic configuration similar to one of the low-side switch SWL and the high-side switch SWH of the above-described embodiments. The electronic switch may also include a plurality of the switching elements coupled between an input terminal and an output terminal of respective conductive lines. Because electronic configurations of the switching elements are similar to each to other, a configuration of a circuit coupled between the input terminal and the output terminal of one of the conductive lines and a configuration of a circuit coupled between the input terminal and the output terminal of another one of the conductive lines have symmetry. The conductive lines may have the same electronic potential or the conductive line may have different electronic potentials.

Each of the constant current sources CM1-CM2 may be configured by a current source circuit having a high accuracy, for example, a current mirror provided by a bipolar junction transistor or a voltage-to-current converter using an operational amplifier.

In the above-described embodiments, the exemplary configurations of the low-side switch SWL are described. The high-side switch SWH may have similar configurations to the low-side switch SWL. In the above-described embodiments, the nMOS transistors M1-M4 are used as switching elements, as an example. Alternatively, the switching elements may be provided by other elements, for example, bipolar junction transistors.

When the nMOS transistors M3 and M4 that constitute the high-side switch SWH are coupled to have the common source, as shown in FIG. 2B and FIG. 18, the gate voltage of the nMOS transistor M3 is equal to the gate voltage of the nMOS transistor M4. Thus, the constant current source CM3 and CM4 may be integrated. Because the nMOS transistors M1 and M3 that constitute the low-side switch SWL are also coupled to have the common source, the constant current source CM1 and CM2 may be integrated. In the switch section SW shown in FIG. 17, the constant current sources CM3z and DM4z may be integrated and the constant current sources CM1z and CM2z may be integrated.

In the above-described embodiments, relations of the connections between the nMOS transistors M1-M4 are described as source-common connections or drain-common connections. These descriptions are made for descriptive purposes so that relation of connections between electric nodes becomes clear. A region where the back gates BG provide by the P type semiconductor layers 24a, 24b, 34, and 39 in FIG. 4, FIG. 7-FIG. 11, FIG. 14-FIG. 16 are electrically coupled is defined as the source region S. Another impurity doping region disposed on an opposite side of the gate G from the source region S is defined as the drain region D.

What is claimed is:

1. A bus switch for connecting and disconnecting a bus connection that couples a plurality of nodes in a daisy chain manner, the bus connection provided by a pair of buses, a part of the plurality of nodes located on an upstream side of the bus switch and the other part of the plurality of nodes located on a downstream side of the bus switch, the bus switch comprising:
   a supporting substrate;
   a first switching element coupled between an input terminal and an output terminal of a high-potential side bus of the pair of buses;
   a second switching element coupled between an input terminal and an output terminal of a low-potential side bus of the pair of buses, wherein:
   the bus connection between the part of the plurality of nodes and the other part of the plurality of nodes is connected when the first switching element and the second switching element are activated;

the bus connection between the part of the plurality of nodes and the other part of the plurality of nodes is disconnected when the first switching element and the second switching element are deactivated;

each of the switching elements includes a plurality of metal-oxide semiconductor transistors and a plurality of resistor elements;

the plurality of metal-oxide semiconductor transistors are located on the supporting substrate and is coupled in series between the input terminal and the output terminal of corresponding one of the pair of buses so as to have a common source or a common drain;

each of the plurality of resistance elements is coupled between a source and a drain of a respective one of the plurality of metal-oxide semiconductor transistors;

each of the switching elements is activated when a predetermined electric current is supplied to the plurality of resistance elements; and each of the switching elements is deactivated when the plurality of resistance elements is deenergized.

2. The bus switch according to claim 1, wherein the plurality of metal-oxide semiconductor transistors is configured so that a plurality of parasitic diodes generated in the supporting substrate is coupled in series in such a manner that a conducting direction of one of the plurality of parasitic diodes is opposite to a conducting direction of another one of the plurality of parasitic diodes.

3. The bus switch according to claim 1, wherein each of the switching elements is configured to apply a reverse bias to a plurality of parasitic diodes generated in the supporting substrate.

4. The bus switch according to claim 1, further comprising:
an electricity-supply circuit coupled between the high-potential side bus and the low-potential side bus, the electricity-supply circuit configured to supply the predetermined electric current to the plurality of the resistance elements so as to activate the first switching element and the second switching element; and
a current bypass circuit coupled between the high-potential side bus and the low-potential side bus, the current bypass circuit configure to divert the electric current that flows toward the plurality of resistance elements in the first switching element to the low-potential side bus.

5. The bus switch according to claim 1, further comprising:
a current source configured to supply the predetermined electric current to the plurality of resistance elements; and
a charge pump circuit configured to increase a potential of one or both of the high-potential side bus and the low-potential bus and configured to apply the increased potential to the current source.

6. The bus switch according to claim 1, wherein each of the plurality of metal-oxide semiconductor transistors is an n-channel metal-oxide semiconductor transistor.

7. The bus switch according to claim 1, wherein:
the supporting substrate has a silicon on insulator structure including a silicon substrate and an insulating layer disposed on the silicon substrate;
the supporting substrate further has an element forming region on the silicon on insulator structure; and
the plurality of metal-oxide semiconductor transistors is located in the element forming region.

8. The bus switch according to claim 1, wherein a configuration of a circuit coupled to the high-potential side bus and a configuration of a circuit coupled to the low-potential side bus have a symmetry.

9. An electronic switch comprising;
an input terminal;
an output terminal; and
a switching element coupled between the input terminal and the output terminal, wherein:
the switching element includes a supporting substrate, a plurality of metal-oxide semiconductor transistors, and a plurality of resistance elements;
the plurality of metal-oxide semiconductor transistors is located on the supporting substrate and is coupled in series between the input terminal and the output terminal so as to have a common source or a common drain;
each of the plurality of resistance elements is coupled between a gate and a source of a respective one of the plurality of metal-oxide semiconductor transistors;
the switching element is activated when a predetermined electric current is supplied to the plurality of resistance elements; and
the switching element is deactivated when the plurality of resistance elements is deenergized.

10. The electronic switch according to claim 9, wherein the plurality of metal-oxide semiconductor transistors is configured so that a plurality of parasitic diodes generated in the supporting substrate is coupled in series in such a manner that a conducting direction of one of the plurality of parasitic diodes is opposite to a conducting direction of another one of the plurality of parasitic diodes.

11. The electronic switch according to claim 9, wherein the switching element is configured to apply a reverse bias to a plurality of parasitic diodes generated in the supporting substrate.

12. The electronic switch according to claim 9, further comprising
a recovering unit configured to recover the electric current that flows toward the plurality of resistance elements.

13. The electronic switch according to claim 9, wherein each of metal-oxide semiconductor transistors is an n-channel metal-oxide semiconductor transistor.

14. The electronic switch according to claim 9, wherein:
the supporting substrate has a silicon on insulator structure including a silicon substrate and an insulating layer disposed on the silicon substrate;
the supporting substrate further has an element forming region on the silicon on insulator structure; and
the plurality of metal-oxide semiconductor transistors is located in the element forming region.

15. The electronic switch according to claim 9, further comprising:
another input terminal;
another output terminal; and
another switching element coupled between the another input terminal and the another output terminal, wherein a configuration of a circuit coupled between the input terminal and the output terminal and a configuration of a circuit coupled between the another input terminal and the another output terminal have a symmetry.

* * * * *